United States Patent
Fujisawa

(10) Patent No.: US 8,593,667 B2
(45) Date of Patent: Nov. 26, 2013

(54) PRINTING APPARATUS HAVING A CONFIDENTIAL FILE STORAGE FOR STORING FILES ATTACHED TO BLIND CARBON COPY MAIL RECEIVED BY THE PRINTING APPARATUS

(75) Inventor: Kuniaki Fujisawa, Tokyo (JP)

(73) Assignee: Oki Data Corporation, Tokyo (JP)

(*) Notice: Subject to any disclaimer, the term of this patent is extended or adjusted under 35 U.S.C. 154(b) by 749 days.

(21) Appl. No.: 12/393,096

(22) Filed: Feb. 26, 2009

(65) Prior Publication Data

US 2009/0219570 A1  Sep. 3, 2009

(30) Foreign Application Priority Data

Feb. 28, 2008 (JP) ................................ 2008-048431

(51) Int. Cl.
*G06F 3/12* (2006.01)
(52) U.S. Cl.
USPC .......................... 358/1.15; 358/1.14; 358/1.16
(58) Field of Classification Search
USPC ........................................ 358/1.14, 1.15, 1.16
See application file for complete search history.

(56) References Cited

U.S. PATENT DOCUMENTS

| | | | |
|---|---|---|---|
| 6,449,055 B1 | 9/2002 | Okimoto et al. | |
| 2002/0051183 A1* | 5/2002 | Tsukui et al. | 358/1.15 |
| 2003/0023696 A1 | 1/2003 | Aikawa et al. | |
| 2004/0196492 A1* | 10/2004 | Johnson et al. | 358/1.15 |
| 2005/0021721 A1* | 1/2005 | Takahashi et al. | 709/223 |
| 2006/0047753 A1* | 3/2006 | Pal | 709/206 |
| 2006/0047765 A1* | 3/2006 | Mizoi et al. | 709/206 |
| 2006/0050299 A1* | 3/2006 | Sakata et al. | 358/1.15 |
| 2006/0066889 A1* | 3/2006 | Asano et al. | 358/1.15 |
| 2007/0041048 A1 | 2/2007 | Suzuki | |
| 2007/0266235 A1* | 11/2007 | Kusano | 713/153 |

FOREIGN PATENT DOCUMENTS

| | | |
|---|---|---|
| EP | 0881816 A | 12/1998 |
| EP | 0923226 A | 6/1999 |
| JP | 11041401 A | 2/1999 |
| JP | 11-177752 A | 7/1999 |
| JP | 2002244977 A | 8/2002 |
| JP | 2003216390 A | 7/2003 |
| JP | 2004152263 A | 5/2004 |
| JP | 2004178082 A | 6/2004 |
| JP | 2004237491 A | 8/2004 |
| JP | 2005004586 A | 1/2005 |
| JP | 2006175813 A | 7/2006 |
| JP | 2006202269 A | 8/2006 |

* cited by examiner

*Primary Examiner* — Marivelisse Santiago Cordero
*Assistant Examiner* — Kent Yip
(74) *Attorney, Agent, or Firm* — Panitch Schwarze Belisario & Nadel LLP

(57) ABSTRACT

The present invention provides a printing apparatus that enables sender to know which file is printable, and which file is unprintable when plural files are attached in a receiving mail and two kinds of printable and unprintable files intermingle in the plural files. The printing apparatus which can print the file attached in a receiving mail, comprises a judging section which judges whether or not the attached file in the receiving mail is printable; and a transferring section that, if the attached file is unprintable on the basis of a judgment result of the judging section, generates a transfer mail which contains information to specify the unprintable file and transfers the transfer mail to a predetermined transfer destination.

10 Claims, 19 Drawing Sheets

| ITEM | CONTENT |
| --- | --- |
| FROM ADDRESS | "printer 1 @ prt. com" |
| SUBJECT | "unable to print" |
| BODY TEXT | "The printer is not able to print this file." |
| ADMINISTRATOR ADDRESS | "abmin @ prt. com" |

*FIG. 2*

| | ERROR TYPE | MESSAGE | SOLUTION | URL | RECEIVER |
|---|---|---|---|---|---|
| 01 | VERSION DIFFERENCE | THE VERSION OF THE ATTACHED FILE IS UNPRINTABLE | PLEASE CHOOSE FILE VERSION [ 1.5 ] AS TYPE OF FILE TO BE MADE AND REMAKE THE FILE. | http://faq.print.com/versions.html | ADMINISTRATOR |
| 02 | PROHIBITION PRINT FILE | THE ATTACHED FILE IS PROHIBITED TO BE PRINTED. | PLEASE CANCEL THE CHECK OF "PROHIBITING PRINTING" IN THE "SECURITY PROPERTY" OF FILE PROPERTY. | http://faq.print.com/security.html | SENDER |
| 03 | MEMORY INSUFFICIENCY (EXPAND PAGE **) | MEMORY INSUFFICIENCY HAPPENED WHEN PRINTING PAGE **. | PLEASE REDUCE THE RESOLUTION OF THE IMAGE ON THIS PAGE. | http://service.print.com | ADMINISTRATOR |
| 04 | MEMORY INSUFFICIENCY (EXCEED PAGE NUMBER) | THE MEMORY USED FOR EXPANDING ALL PAGES IS INSUFFICIENT. | PLEASE DIVIDE THE FILE INTO SEVERAL FILES AND THEN SEND ONE BY ONE. | http://faq.print.com | SERVICE CENTER |

*FIG. 7*

| ITEM | CONTENT | |
|---|---|---|
| FROM ADDRESS | "printer 1 @ prt. com" | |
| SUBJECT | "unable to print" | |
| BODY TEXT | "The printer 1 is not able to print this file." | |
| REPLY DESTINATION ADDRESS | ADMINISTRATOR | "abmin @ prt. com" |
| | SERVICE CENTER | "service @ shop. com" |
| | | |

*FIG. 8*

| ID | PIN | FILE |
|---|---|---|
| 555 | 5281 | xxx.pdf |
| 123 | 4492 | △△△.pdf |

*FIG. 16*

PRINTING APPARATUS HAVING A CONFIDENTIAL FILE STORAGE FOR STORING FILES ATTACHED TO BLIND CARBON COPY MAIL RECEIVED BY THE PRINTING APPARATUS

FIELD OF THE INVENTION

The invention relates to a printing apparatus which can receive an E-mail and print file attached in the E-mail.

BACKGROUND OF THE INVENTION

There is such printing apparatus which can receive an E-mail and print file attached in the E-mail nowadays. The conventional printing apparatus can only print those printable attached file. (Such technology may refer to patent document 1.)

Patent document 1: Japan patent publication H11-177752.

However, though different types of file can be attached to the E-mail, printing apparatus only can print some limited types of file such as PDF (Portable Document Format) and the like, and could not support various functions of E-mail.

SUMMARY OF THE INVENTION

It is, therefore, an object of the invention to provide a printing apparatus capable of solving the above problem.

A first aspect of the invention is to provide a printing apparatus which can print the file attached in a receiving mail, the printing apparatus comprises a judging section which judges whether or not the attached file in the receiving mail is printable; and a transferring section that, if the attached file is unprintable on the basis of a judgment result of the judging section, generates a transfer mail which contains information to specify the unprintable file and transfers the transfer mail to a predetermined transfer destination.

A second aspect of the invention is to provide a printing apparatus which can print the file attached in a receiving mail, the printing apparatus comprises a judging section which judges whether or not the attached file in the receiving mail is printable; and a transferring section that, if the attached file is unprintable on the basis of a judgment result of the judging section, obtains reason representing why it is unprintable from the judging section, generates a transfer mail which contains the reason and transfers the transfer mail to a predetermined transfer destination.

A third aspect of the invention is to provide a printing apparatus which can print the file attached in a receiving mail, the printing apparatus comprises a judging section that judges whether or not a confidential print is designated to the attached file; and a storing section that stores the file when the confidential print is designated.

EFFECT OF THE INVENTION

According to the invention 1, when there are attachments in the received mail, if the attachment is printable, the printing apparatus will print it; if the attachment is unprintable, it will be transferred to a predetermined sending destination. Therefore, the sender has no need to confirm whether the attachment is printable or not.

According to the invention 2, if there's unprintable attachment in the received mail, the reason for unprintable and the solution to print it out will be recorded in the transfer mail. The user can easily get the reason and solution when receiving the transfer mail, and do the relevant action to print it out after read the transfer mail.

BRIEF DESCRIPTION OF THE DRAWINGS

FIG. 2 is an explanation diagram of an example to store transfer use information into setting information storing section in embodiment 1;

FIG. 7 is an explanation diagram of an example to store error message into error message storing section;

FIG. 8 is an explanation diagram of an example to store transfer use information into setting information storing section in embodiment 2;

FIG. 16 is an explanation diagram for explaining print possible/impossible judging means;

DETAILED DESCRIPTION OF THE PREFERRED EMBODIMENTS

Embodiments of the invention will be described in detail here in below with reference to the drawings.

Figure 19:
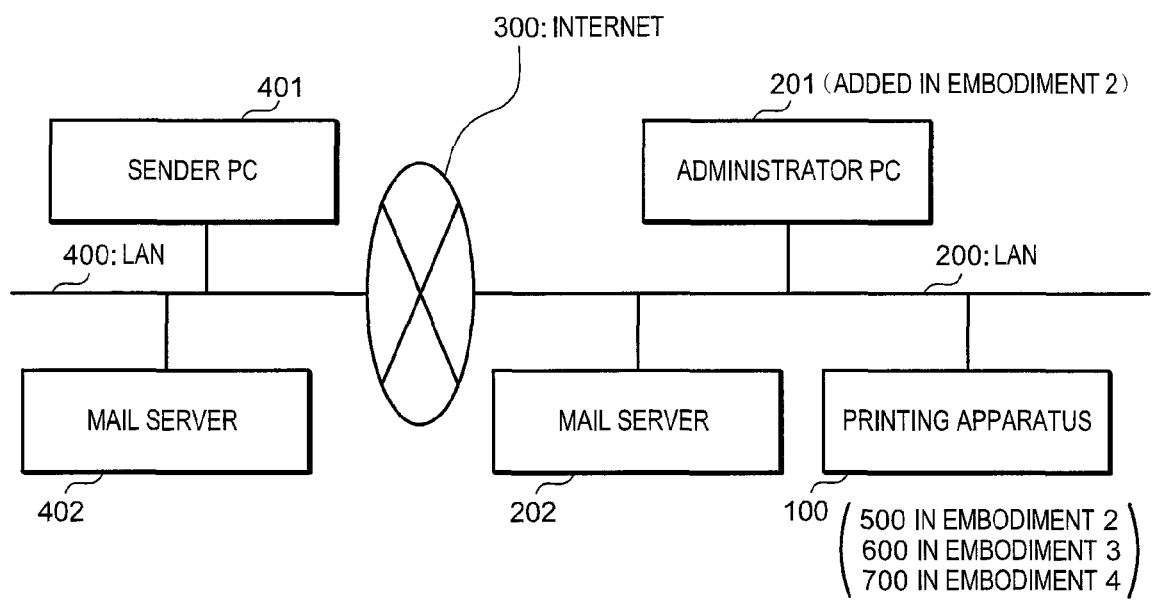
FIG. 19 is a structure diagram of network containing printing apparatus of the present invention.

FIG. 19 is a structure diagram of network containing printing apparatus of the present invention.

As shown by the FIG. 19, LAN 200 is a local area network connecting the printing apparatus 100 with internet 300. Mail server 202 is a mail receiving and sending server through internet 300. The mail server 202 will temporarily store the mail after received the mail sending to printing apparatus 100. In addition, it will temporarily store the mail sending from printing apparatus 100, and then transfer to internet 300.

Sender PC401 and mail server 402 are connected on LAN400, which is connected with internet 300. Sender PC401 is a normal PC which has the function of receiving and sending E-mails. Mail server 402 receives and sends E-mail through internet 300, and send PC401 through mail server 402. In addition, as usual, LAN 200 and internet 300 are connected through router, gateway, and etc, but it doesn't relate to the present invention, so it will be omitted in FIG. 19.

Based on the above network structure, the receiver will clearly know whether the attachment can be printed or not, and the reason for unprintable when an E-mail has several attachments through the printing apparatus 100 of the present invention (500 in embodiment 2, 600 in embodiment 3, 700 in embodiment 4) and effectively solve the problem.

The following is to explain in detail the embodiments of the printing apparatus in which the present invention is directly applied.

<Embodiment 1>

Figure 1:
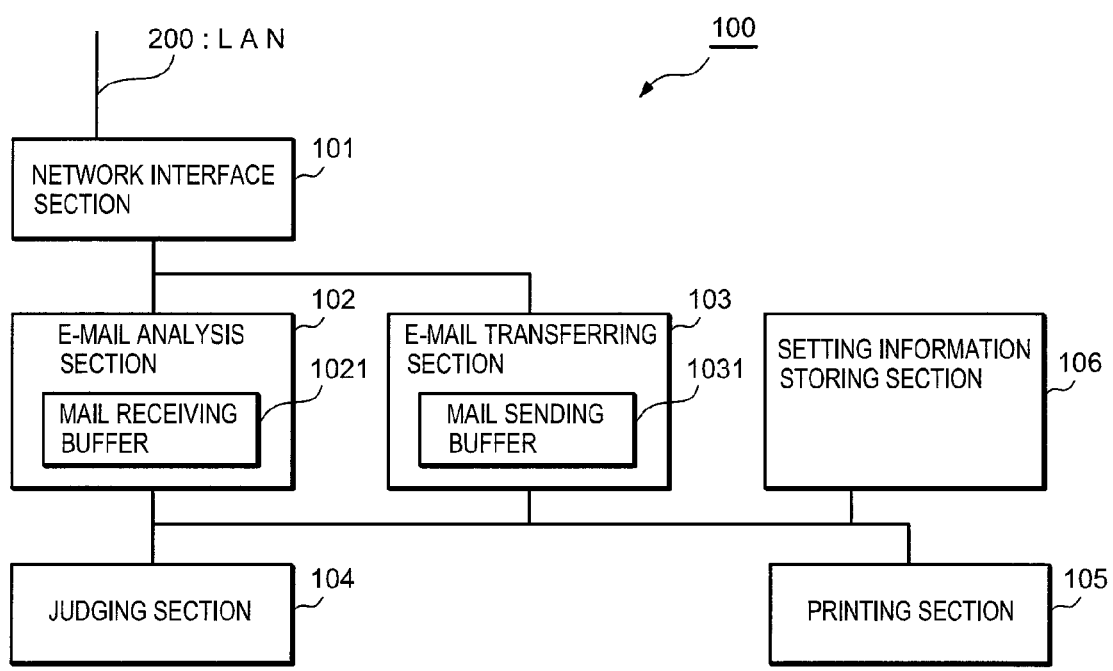
FIG. 1 is a functional block diagram of printing apparatus in embodiment 1.

FIG. 1 is a functional block diagram of printing apparatus in embodiment 1.

As shown by FIG. 1, the printing apparatus 100 in embodiment 1 is composed of network interface 101, E-mail analysis section 102, E-mail transferring section 103, judging section 104, printing section 105 and setting information storing section 106.

Network interface 101 is an interface part between the printing apparatus 100 and LAN 200 to receive and send E-mail through LAN 200.

There's a mail receiving buffer 1021 in the E-mail analysis section 102, which is to analyze and extract the sending source information and the attachment of the network interface 101. Setting information storing section 106 will store the sending source information after temporarily saving in mail receiving buffer. Here, mail receiving buffer is buffer storage to temporarily store the receiving mail from network interface section.

There's a Mail sending buffer 1031 in E-mail transferring section 103, which is to form an unprintable E-mail that is decided by the judging section 104, and then send to the sender PC 401 (FIG. 19) through network interface section. Here, mail sending buffer 1031 is to temporarily store the said unprintable file and used as buffer storing section when transferring mail.

Judging section 104 is to analyze and judge whether the attached file extracted from E-mail analysis section can be printed out through printing section 105. Printing section 105 will print out the printable file judged by judging section 104 to the printing paper.

Setting information storing section 106 is a storing section to store the setting information of action in printing apparatus 100 in advance. In addition, setting information storing section 106 will also store the information of making E-mail header and text (information of E-mail's sender) extracted from E-mail analysis section and E-mail transferring section 103 of the said E-mail. The following figures are to explain the content of the embodiment.

FIG. 2 is an explanation diagram of an example to store transfer use information into setting information storing section in embodiment 1.

As shown by FIG. 2, the content composed of the mail address of the sending source information of the subject, information of the text and the mail address of the administrator and etc. is stored.

The following flowchart is to explain the operation of the printing apparatus 100 in embodiment 1.

Figure 3:
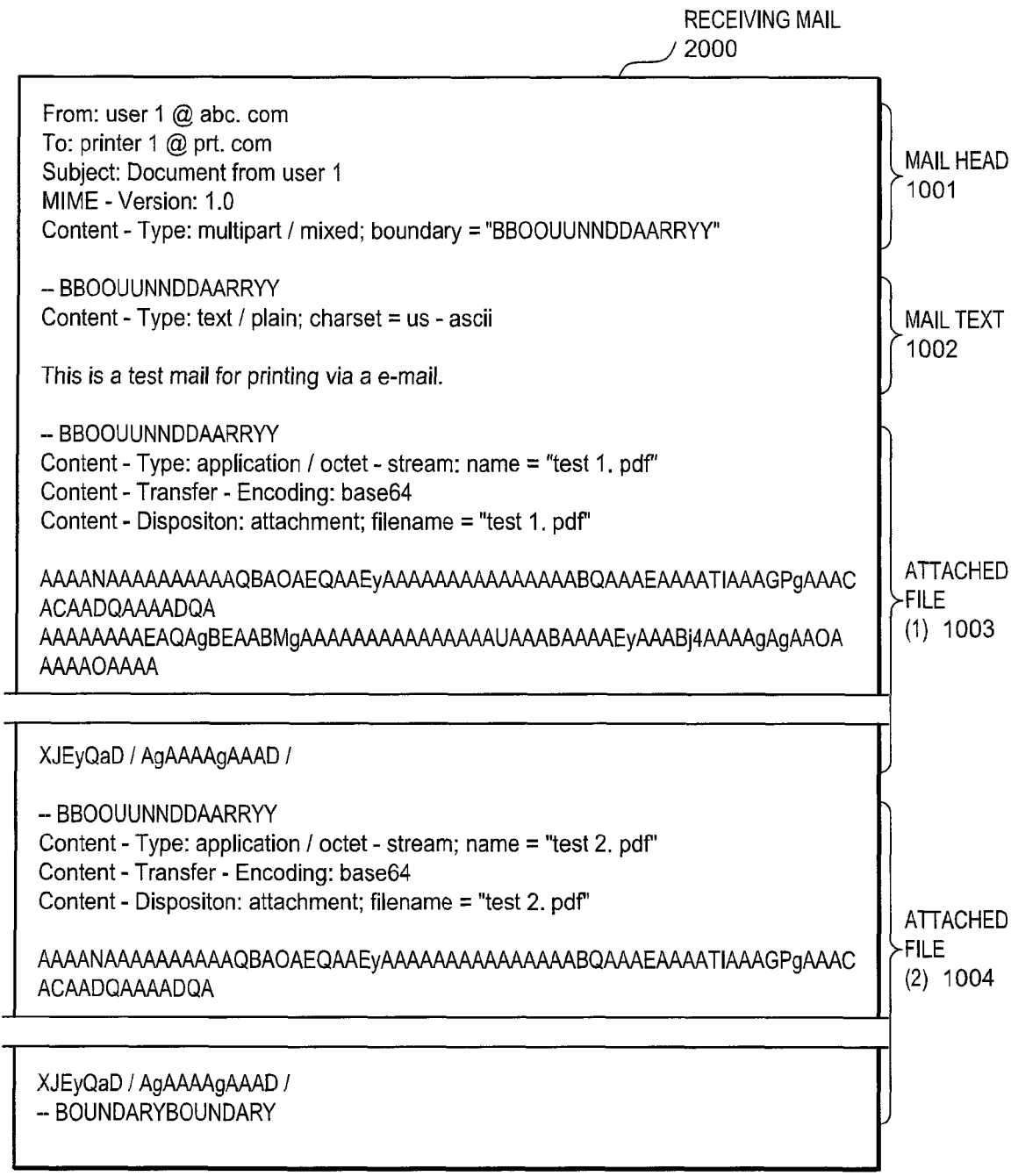
FIG. 3 is an explanation diagram of an example showing content of a receiving mail in embodiment 1.

Firstly, the premise of the operation has the following standards:

As shown by FIG. 19, the sender will use send PC 401 to send E-mail through mail server 402, internet 100 and mail server 202 to the printing apparatus 100, and received by the printing apparatus 100. The content of receiving mail 1000 is shown by FIG. 3 (the example). As usual, the files are attached under the type of MIME, which is a normal type, so the detail explanation is omitted.

FIG. 3 is an explanation diagram of an example showing content of a receiving mail in embodiment 1.

As shown by FIG. 3, the mail header 1001 is a subject showing the address of the E-mail receiver and sender, including "MIME-Version" field.

In addition, the sending source information is recorded in the field of "From", which is shown as user1@abc.com in receiving mail 1000. The mail text 1002 records the mail body text.

Attached file (1)1003 is the first attachment, which is attached after BASE64 coding of the file named as "test1.pdf".

Attached file (2)1004 is the second attachment "test2.pdf", which is also attached after BASE64 coding, same as Attached file (1)1003.

In the present embodiment, to explain the operation of printing apparatus 100, assuming that "test1.pdf" attached as attached file (1)1003 is a printable file and "test2.pdf" attached as attached file (2)1004 is an unprintable file due to its version difference, according to the above premise, the mail transferring section 103 will form a transfer mail and reply to sender PC401 due to the unprintable of attached file (2)1004. Following is an example of transferring mail, and the detail content will be explained in the operation explanation according to the request.

Figure 4:
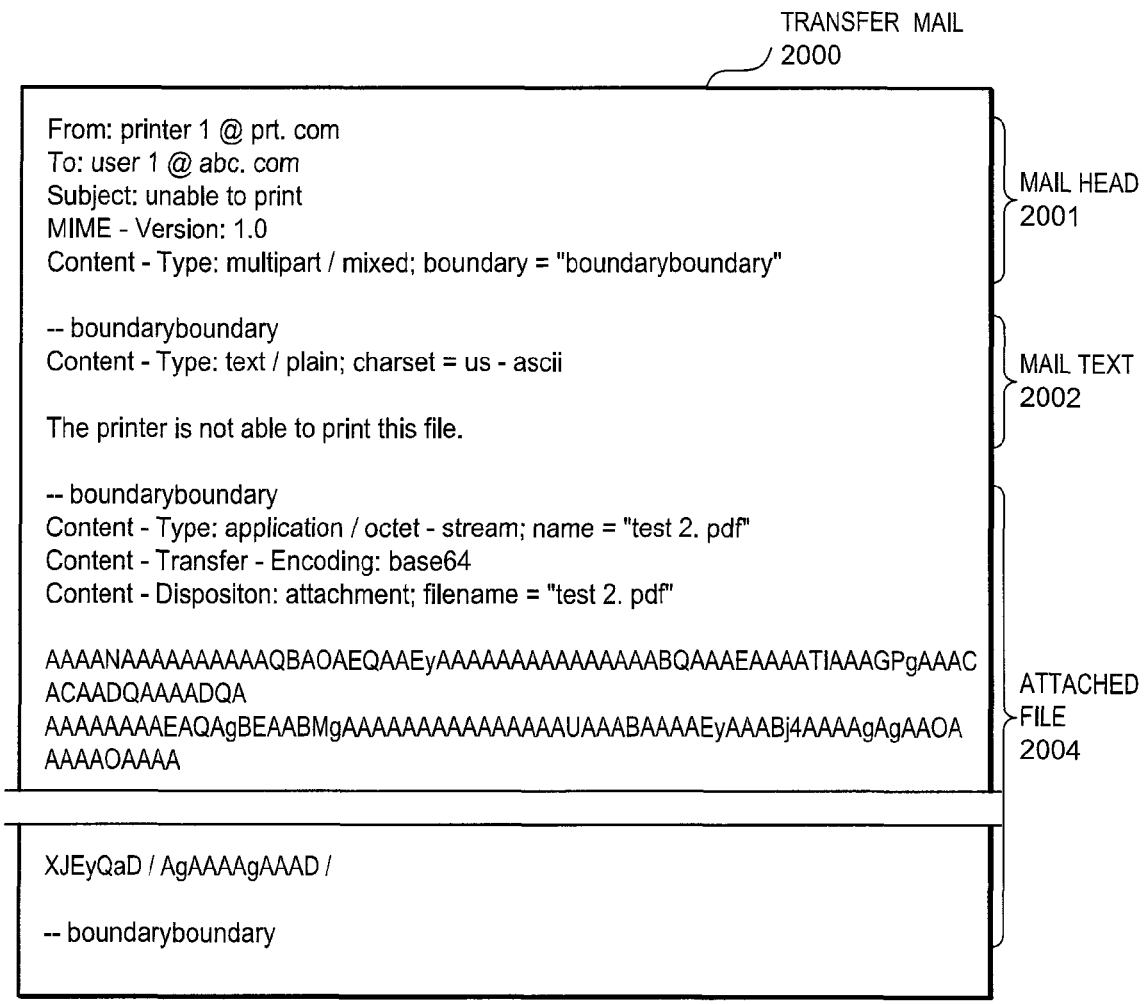
FIG. 4 is an explanation diagram of an example showing content of a transfer mail in embodiment 1.

FIG. 4 is an explanation diagram of an example showing content of a transfer mail in embodiment 1.

As shown by FIG. 4, Mail head 2001 is made based on the setting information abstracted from setting information storing section 106 and the sending source information from the receiving mail 1000 to record the sending source information user1@abc.com as the value of the field "To" showing the receiver's address of the transfer mail. In the present embodiment, mail text 2002 records the information abstracted from setting information storing section 106. The unprintable "test2.pdf" will be attached as attached file 2004 in the present embodiment based on the above premise.

Printing apparatus 100 will have the following operations according to the above premise.

Figure 5:
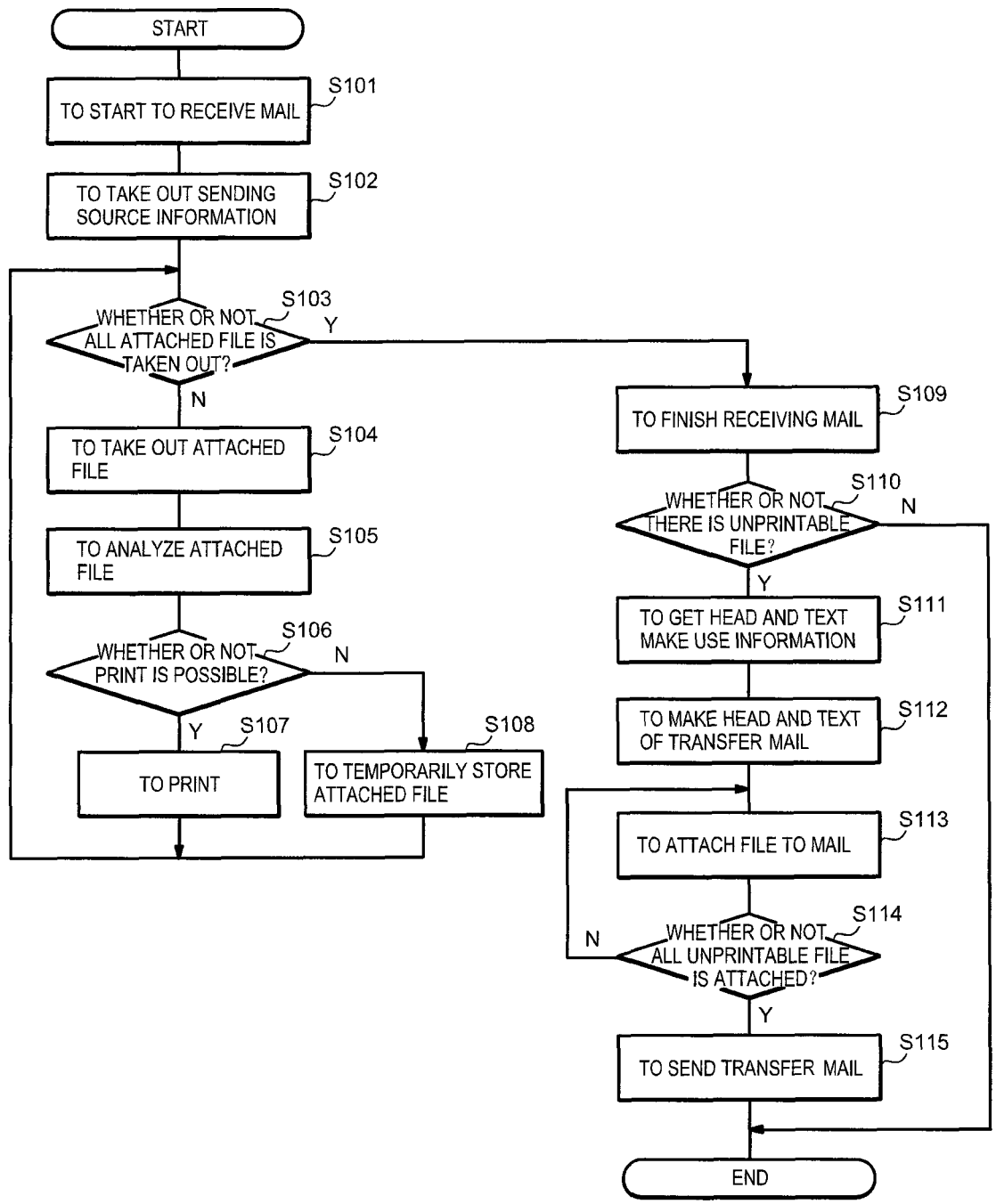
FIG. 5 is a flowchart for explaining operation of printing apparatus in embodiment 1.

FIG. 5 is a flowchart for explaining operation of printing apparatus in embodiment 1.

In the following operation explanation, the action of mail making and sending in the sender PC401 and transferring between mail server 402 and 202 will be omitted since they are common actions. In addition, the explanation of the communication between mail server 202 and network interface 101 of printing apparatus 100 which is based on the SMTP protocol will also be omitted since the control of mail sending and receiving based on SMTP protocol is also a common technique.

Following is the explanation of the steps from S101 to S115 through the Figures.

Step S101

Printing apparatus 100 starts to receive mails. The above receiving mail 100 receives the mail from sender PC 401 through mail server 402, internet 300 and mail server 202.

Step S102

The above receiving mail 1000 will be temporarily stored in the mail receiving buffer of mail analysis section 102 through network interface 101 and be analyzed. Firstly, mail analysis section 102 will take out the sending source information from receiving mail 1000, which is temporarily stored in mail analysis section 102, and then be stored to setting information storing section 106. Afterwards, the mail analysis section 102 will go on to the action of taking out the attachment from receiving mail 1000.

Step S103

Here, if there's no attachment or all the attachments have been taken out, it will go on to step S109; if there's an attachment that hasn't been analyzed, it will go on to step S104.

Step S104

Mail analysis section 102 will analyze the receiving mail 1000 from the very beginning. According to the above premise, mail analysis section 102 will firstly take out attached file (1)1003 to do the BASE64 coding, and send the reverted "test1.pdf" to judging section 104.

Step S105

Judging section 104 will receive the attachment from mail analysis section 102 and judge whether it is printable. According to the above premise, "test1.pdf" is judged as printable.

Step S106

If the result of judging the printable, it will go on to the step S107, if not, it will go on to the step S108. Here, for example, if printing section 105 can print PDF file, judging section 104 will judge the limits whether the file has extension name as ".PDF", whether the type of PDF is appropriate and whether it is based on safe printing and so on. According to the above premise, "test1.pdf" is judged as printable, so it will be transferred to printing section 105.

Step S107

Printing section 105 will print out the receiving mail. According to the above premise, "test1.pdf" will printed on the printing paper. After the process of the first attachment, it will go back to step S103 and add next file to receiving mail 1000 to do the same process till all the files have been finished. According to the above premise, there will be attached file (2)1004, so mail analysis section 102 will continue to extract attached file (2)1004 and do BASE64 coding, and then transfer the reverted "test2.pdf" to judging section 104 (Step 104). Judging section 104 will judge whether the reverted "test2.pdf" is printable (Step 105). Here, since "test2.pdf" is such a type that can't be printed in printing section 105, judging section 104 will judge "test2.pdf" as unprintable, then it will go on to Step S108.

Step S108

The unprintable file will be transferred to mail transferring section 103, and temporarily stored in sending mail suffer 1031, then it will go back to Step S103. Here, according to the above premise, "test2.pdf" will be transferred to mail transferring section 103, and temporarily stored in sending mail suffer 1031, then it will go back to Step S103. Following will repeat the same action till all the files have been finished, and then it will go to Step S109. According to the above premise, "test2.pdf" will go to Step S109 after transaction.

Step S109

The receiving mail 1000 in mail receiving buffer 1021 will be abandoned after network interface 101 finishes receiving mails.

Step S110

Afterwards, it will judge whether there's unprintable file in receiving mail 1000. Here, if there's no unprintable file, the information of sender in mail sending buffer 1031 will be abandoned, so it is the end of the operation of present embodiment. If there's unprintable file, it will go on to Step S111. According to the above premise, "test2.pdf" will be judged as unprintable file, and go on to Step S111.

Step S111

The unprintable file will be temporarily stored in mail sending buffer 1031 and mail transferring section 103 will make a transfer mail 2000. Firstly, mail transferring section 103 will extract information for making mail head 2001 and mail text 2002 from setting information storing section 106.

Step S112

Mail transferring section 103 will continue to make mail head 2001 and mail text 2002 in mail sending buffer 1031. Meanwhile, the sending source information of receiving mail 1000 extracted from Step S102 will be recorded in the mail head 2001 field "To" as receiver's address in transfer mail 2000. According to the above premise, it will be recorded as user1@abc.com.

Step S113

Afterwards, mail transferring section 103 will add the temporarily stored unprintable file to transfer mail. According to the above premise, "test2.pdf" will be attached to transfer mail.

Step S114

Repeat the action of adding unprintable file to transfer mail till all files have finished this action. According to the above premise, since only "test2.pdf" has been judged as unprintable file in receiving mail 1000, it will go on to next step after transfer mail 2000 finished its making. According to the above premise, transfer mail 2000 through mail transferring section 103 is shown by FIG. 4. Here, mail head 2001 is made based on the setting information from setting information storing section 106 and sending source information from receiving mail 1000. According to the above premise, the value in filed "To" of the receiver's address of transfer mail's is recorded as user1@abc.com which is sending source information from receiving mail 1000 in Step S102. Mail text 2002 is recorded as message extracted from setting information storing section 106. "Test2.pdf" is attached as attached file 2004 in the present embodiment.

Step S115

Mail transferring section 103 will transfer the transfer mail to network interface 101, then network interface 101 will send mail to mail server 202, that's the end of the process.

In addition, transfer mail 2000 which is sent to mail server 202 will be transferred to mail sever 402 through internet 300. Sender will receive transfer mail 2000 from mail server 402 through sender PC401. After reading transfer mail 2000, sender will know that "test2.pdf" is the only unprintable file in printing apparatus 100; therefore, he will take the solution, such as printing "test2.pdf" with printer driver.

Since "test1.pdf" has already been printed with printing apparatus 100, it will not be attached in transfer mail 2000, and sender has no need to confirm which attachments are printable or not.

As stated above, through the present embodiment, when two kinds of printable and unprintable attachments are attached in the E-mail, the printable file will be printed with printing apparatus, only the unprintable file will be transferred to a predetermined address. So we get the effect that the sender has no need to confirm which attachments are printable or not. Therefore, sender only has to take the solution such as printing the file in the transfer mail with an application as printing driver.

In the above explanation, we have introduced the embodiment of adding unprintable file to transfer mail, but the present invention is not limited in this example. That is to say, we can use file name to replace the data of unprintable file to inform sender. Moreover, we can use the file name of printable file to replace the data or file name of unprintable file to inform the sender.

<Embodiment 2>

In the above embodiment 1,unprintable file has been transferred to a predetermined address when there are two kinds of printable and unprintable files in an E-mail. Therefore, the sender has no need to confirm which attachments are printable or not. In the present embodiment, the reason for unprintable file will be transferred based on embodiment 1. In order to achieve the relevant objective, the printing apparatus of the present embodiment has the following structure.

Figure 6:
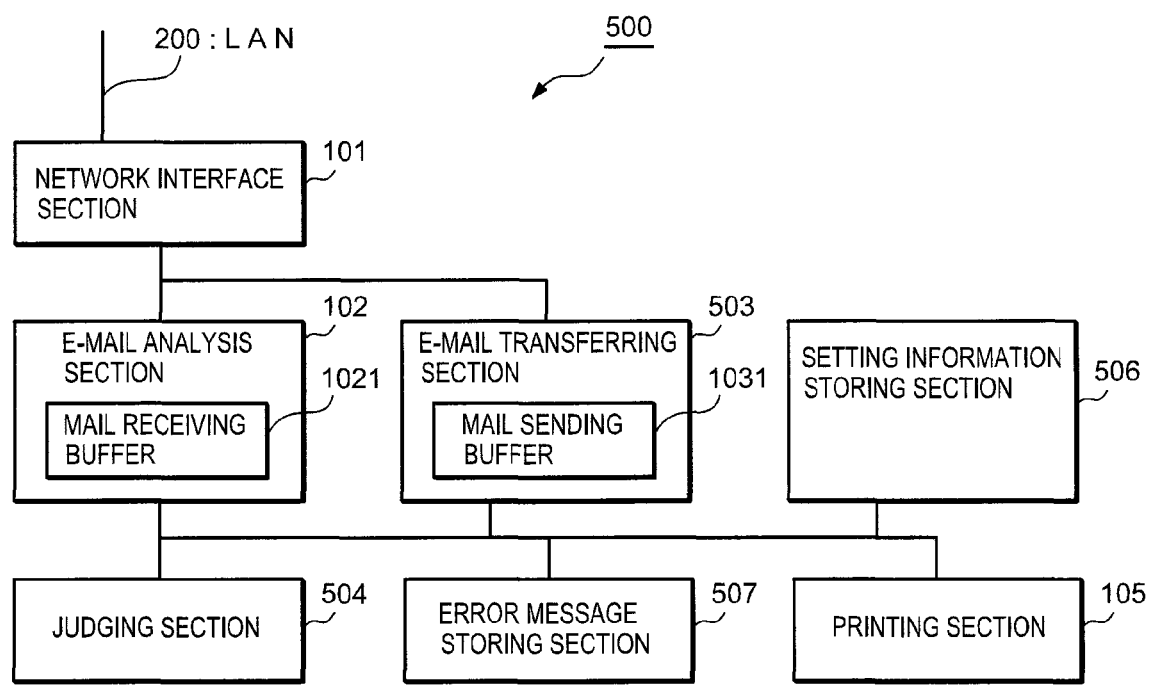
FIG. 6 is a functional block diagram of printing apparatus in embodiment 2.

FIG. 6 is a functional block diagram of printing apparatus in embodiment 2.

As shown by FIG. 6, printing apparatus 500 in embodiment 2 comprises network interface 101, mail analysis section 102, mail transferring section 503, judging section 504, printing section 105, setting information storing section 506 and error message storing section 507.

Following will only explain the different part from embodiment 1, and same part and symbol will be omitted.

There's a mail transferring section 503 in mail sending buffer 1031, which is a part that will form an E-mail that has been judged as unprintable file by judging section 504, and then been sent to sender PC401 (FIG. 19) through network interface 101. In the E-mail, the error kind information will be extracted from error message storing section 507 according to judging section 504, and the relevant part will be recorded.

Judging section 504 will analyze and judge whether the attached file extracted from mail analysis section 102 can be printed with printing section 105. If the judgment is unprintable, the reason for unprintable will be informed as error kind information.

The relative error kind information, solution, solution URL and type of transfer address outputted from judging section 504 is stored in error message storing section 507 according the retrieval of mail transferring section 503 to output the error information and solution relative to the error information. Following is the explanation of storage type of error kind in error message storing section 507.

FIG. 7 is an explanation diagram of an example to store error message into error message storing section.

As shown by FIG. 7, as an example of error kind, assuming that there are four items: 01 is version difference, 02 is prohibiting of printing, 03 is memory insufficiency (expanding ** pages), 04 is memory insufficiency (exceeded page number) and the relative information, solution, URL and replying address.

Setting information storing section 506 is an information setting section that all parts of storage printing apparatus 500 need to take all actions. The setting information includes transfer mail address of mail transferring section 503 to transfer the unprintable file, mail address of the sender, sending source information, text information and the relevant information to make mail head and text. In addition, there is several mail addresses will be stored as transfer mail address. Following is the detail explanation of the content with figures.

FIG. 8 is an explanation diagram showing the content of a transfer mail in setting information storing section in embodiment 2

As shown by FIG. 8, the present embodiment also contains replying mail address besides sender mail address, subject information and text information in setting information storing section 106.

In addition, go back to FIG. 19, compare to embodiment 1, administrator PC201 is attached on LAN200, which is the administrator PC of printing apparatus 500, and has the function of receiving and sending mail through mail server 202.

Following is the detail explanation of the operations of printing apparatus 500 in embodiment 2 with flowchart.

Firstly, the premise of the operation has the following standards:

As shown by FIG. 19, sender will send E-mail to printing apparatus 500 with sender PC401 through mail server 402, internet 300 and mail server 202. It is assumed that the content of receiving mail is the same as the action of receiving mail 1000 (FIG. 3) in embodiment 1.

Therefore, according to the above premise, "test2.pdf" attached as attached file (2)1004 the same way in embodiment 1 is unprintable because of its version difference, so mail transferring section 503 will form a transfer mail and reply to sender PC401. In the present embodiment, the content of transfer mail is different from that in embodiment 1. Following is the explanation of the summary, and the detail will be explained in the flowchart.

Figure 9:
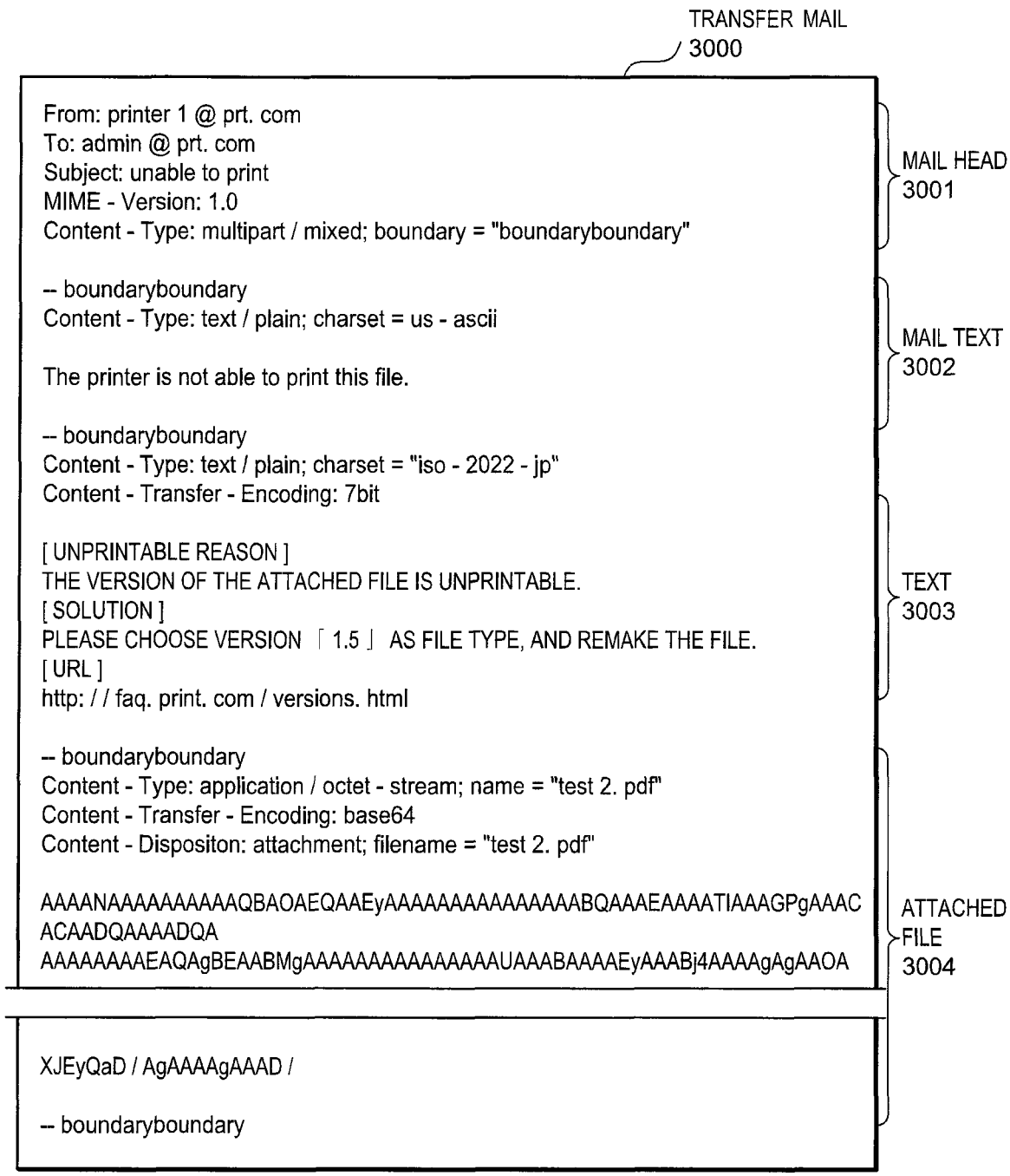
FIG. 9 is an explanation diagram of an example showing content of a transfer mail in embodiment 2.

FIG. 9 is an explanation diagram of an example showing content of a transfer mail in embodiment 2.

It is showing the example of transfer mail 3000 made through mail transferring section 503. Mail head 3001 is made based on the setting information extracted from setting information storing section 506. In the present embodiment, the value of field "To" in receiver's address of receiving mail 1000 is showing the status of administrator's mail address who has chosen to store in setting information storing section 506. In the present embodiment, mail text 3002 records the information extracted from setting information storing section 506. Text 3003 is made based on the reason for unprintable, solution and URL of attached file 3004 extracted from error message storing section 507. "Test2.pdf" is attached as attached file 3004 in the present embodiment.

According to the above premise, printing apparatus 500 will do the following operations.

Figure 10:
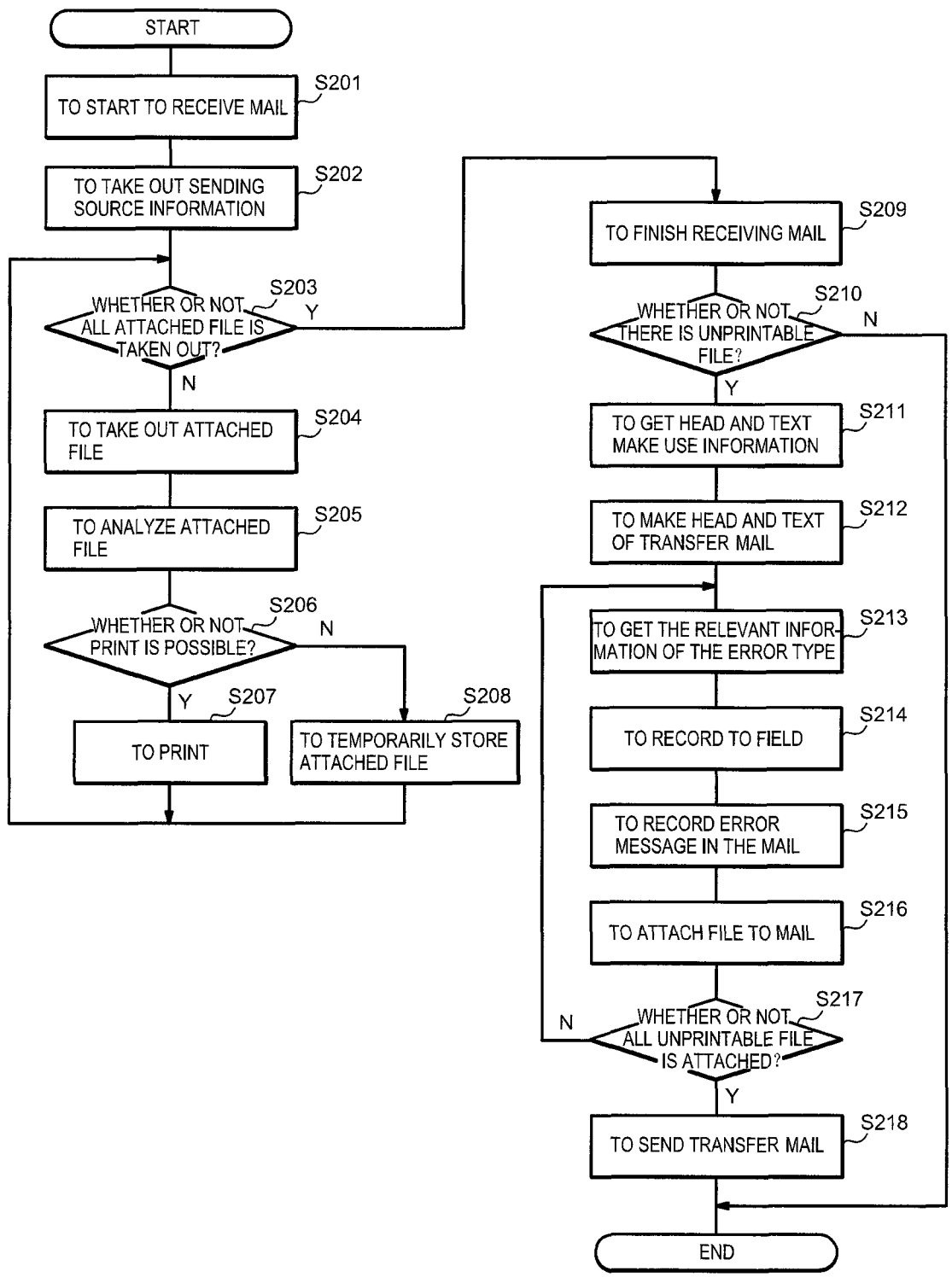
FIG. 10 is a flowchart for explaining operation of printing apparatus in embodiment 2.

FIG. 10 is a flowchart for explaining operation of printing apparatus in embodiment 2.

In the following explanation of operations, the action of mail making and sending in sender PC401 and mail transferring in mail server 402 and 202 will be omitted since they are common actions. In addition, the communication between mail server 202 and network interface 101 of printing apparatus 500 which is based on the SMTP protocol will also be omitted since the control of mail sending and receiving based on SMTP protocol is also a common technique.

Following is the explanation of the steps from S201 to S218 through FIG. 3, FIG. 6, FIG. 7, FIG. 8 and FIG. 9.

Step S201

Printing apparatus 500 starts to receive mail. The above receiving mail 1000 is sent by sender PC 401 and received through mail server 402, internet 300 and mail server 202.

Step S202

The above receiving mail 1000 through network interface 101 will be temporarily stored in mail receiving buffer 1021 of mail analysis section 102 and to be analyzed. Firstly, mail analysis section 102 will take out the sending source information from receiving mail 1000 and be temporarily stored in mail receiving buffer 1021 of mail analysis section 102, and then be stored in setting information storing section 506. Afterwards, mail analysis section 102 will go on to the action of taking out the attached file form receiving mail 1000.

Step S203

Here, if there's no attached file or all the files have been taken out, it will go on to Step S209; if there's attached file that hasn't been analyzed, it will go on the Step S204.

Step S204

Mail analysis section 102 will analyze the receiving mail 1000 (FIG. 3) from the very beginning. According to the above premise, mail analysis section 102 will firstly take out attached file (1)1003 and do BASE64 coding, and then transferred the reverted "test1.pdf" to judging section 504.

Step S205

Judging section 504 will receive the attached file though mail analysis section 102 and judge whether it is printable. According to the above premise, "test1.pdf" will be judged as printable.

Step S206

If the judgment is printable, it will go on to Step S207, if not; it will go on to Step S208. Here, for example, if printing apparatus 105 can print PDF file, judging section 504 will judge the following items such as whether the attachment has an extension file name of ".PDF", whether the version of PDF file is appropriate and whether there is a limitation of printing based on the safety settings. According to the above premise, "test1.pdf" will be judged as printable, so it will be transferred to printing apparatus 105.

Step S207

Printing apparatus 105 will print out the receiving file. According to the above premise, "test1.pdf" will be printed on the printing paper. After the process of the first attachment, it will go back to step S203 and add next file to receiving mail 1000 to do the same process till all the files have been finished. According to the above premise, since there is attached file (2)1004, mail analysis section 102 will continue to extract attached file (2)1004 to do BASE64 coding and transferred the reverted "test2.pdf" to judging section 504 (Step S204). Judging section 504 will judge whether the reverted "test2.pdf" can be printed or not (Step S205). Here, according to the above premise, since "test2.pdf" is such a type of file that can't be printed in printing apparatus 105, judging section 504 will judge it as unprintable and go on to Step S208.

Step S208

The unprintable file will be temporarily stored in mail transferring section 503. Here, "test2.pdf" and error kind message version difference (01) will be transferred to mail transferring section 503 at the same time and be temporarily stored in mail sending buffer 1031, and then go back to Step S203. The following will do the same process till all the files have been finished and go on to Step S209. According to the above premise, "test2.pdf" will go on to Step S209 after finished the process.

Step S209

Network interface 101 finishes the action of mail receiving and the receiving mail 1000 in mail receiving buffer 1021 will be abandoned.

Step S210

Afterwards, it will judge whether there's unprintable file in receiving mail 1000. Here, if there's no unprintable file, sending source information in mail sending buffer 1031 will be abandoned, and that's the end of operations of the present embodiment. If there's unprintable file, it will go on to Step S211. According to the above premise, "test2.pdf" will be judged as unprintable file and go on to Step S211.

Step S211

The unprintable file will be temporarily stored in mail sending buffer 1031, and mail transferring section 503 will make transfer mail 3000. Firstly, mail transferring section 503 will extracted information from setting information storing section 506 to make mail head 3001 and mail text 3002.

Step S212

Mail transferring section 503 will continue to make mail head 3001 and mail text 3002 in mail sending buffer 1031. Meanwhile, field "To" hasn't recorded the receiver's address of transfer mail 3000.

Step S213

Afterwards, mail transferring section 503 will extract the error message, solution, URL (which records the website of the detail explanation) and type of transfer address form error message storing section 507 according to the error kind information judged by judging section 504 in Step S208. Here, since the error kind message is "version difference 01", according to FIG. 7, from error message storing section 507, the error message is "The type of the attachment can not be printed", the solution is "Please choose file type '1.5' as type of making file and remake", URL is "http://faq.print.com/versions.html". In addition, the receiver's address of transfer mail 3000 is "administrator".

Step S214

Mail transferring section 503 will record the value in field "To" of mail head 3001. Here, since the extracted receiver's address is "administrator" in Step S213, as shown by FIG. 8, field "To" will record admin@prt.com. Here, if the receiver's information extracted from Step S213 is "sender", it will choose the sending source information in receiving mail 1000 in Step S202 and field "To" will record user1@abc.com. At the moment, field "To" of mail head 3001 is the same as mail head 2001 in FIG. 4.

Step S215

Afterwards, mail transferring section 503 will record the extracted error message, solution and solution URL as text 3003 in transfer mail 3000.

Step S216

Mail transferring section 503 will add the temporarily stored unprintable file to transfer mail. According to the above premise, it is said to add "test2.pdf".

Step S217

Repeat the action of adding unprintable file to transfer mail till all files have finished this action. According to the above premise, since "test2.pdf" is the only file that has been judged as unprintable file in the attached file in receiving mail 1000, after the making of transfer mail 3000, it will go on to next action. According to the above premise, the transfer mail 3000 made by mail transferring section 503 is shown by FIG. 9.

Step S218

After attached the reason for unprintable and solution to transfer mail 3000, the transfer mail 3000 will be sent to network interface 101 to send out and that's the end of the process.

Moreover, since the receiver's address of the transfer mail 3000 sent to mail server 202 is recorded as mail address of administrator in the present embodiment, the administrator can receive mail through administrator PC201. After read transfer mail 3000, administrator will know that "test2.pdf" is the only unprintable file in printing apparatus 500 and the reason and solution for unprintable. In the present embodiment, administrator only needs to update and remake the version of "test2.pdf" and resend the mail to print it out.

Since "test1.pdf" has already been printed with printing apparatus 500, it will not be attached in transfer mail 3000, and administrator has no need to confirm which attachments are printable or not.

If the extracted transfer address is "sender" in Step S213, after made, the receiving address of transfer mail 3000 will be sender PC401. The sender will also know that "test2.pdf" hasn't been printed and the reason and solution of it after received the transfer mail 3000.

As stated above, it will only transfer the unprintable file when there're two kinds of printable and unprintable attachments in the receiving E-mail. Moreover, transfer mail will record the reason for different unprintable file and solution to print them out and so on.

Therefore, the user who has read the transfer mail attached with unprintable file can easily get the reason and solution of it, so if he gets the relevant solution of printing the unprintable file, he will get the effect of reprinting.

In addition, according to the reason for unprintable, he will get the effect of appropriately choosing the receiver's address per the request of the unprintable file.

<Embodiment 3>

In the present embodiment, sending mail contains the print property message of the attached file. To achieve the relevant objective, the printing apparatus in the present embodiment has the following structure.

Figure 11:
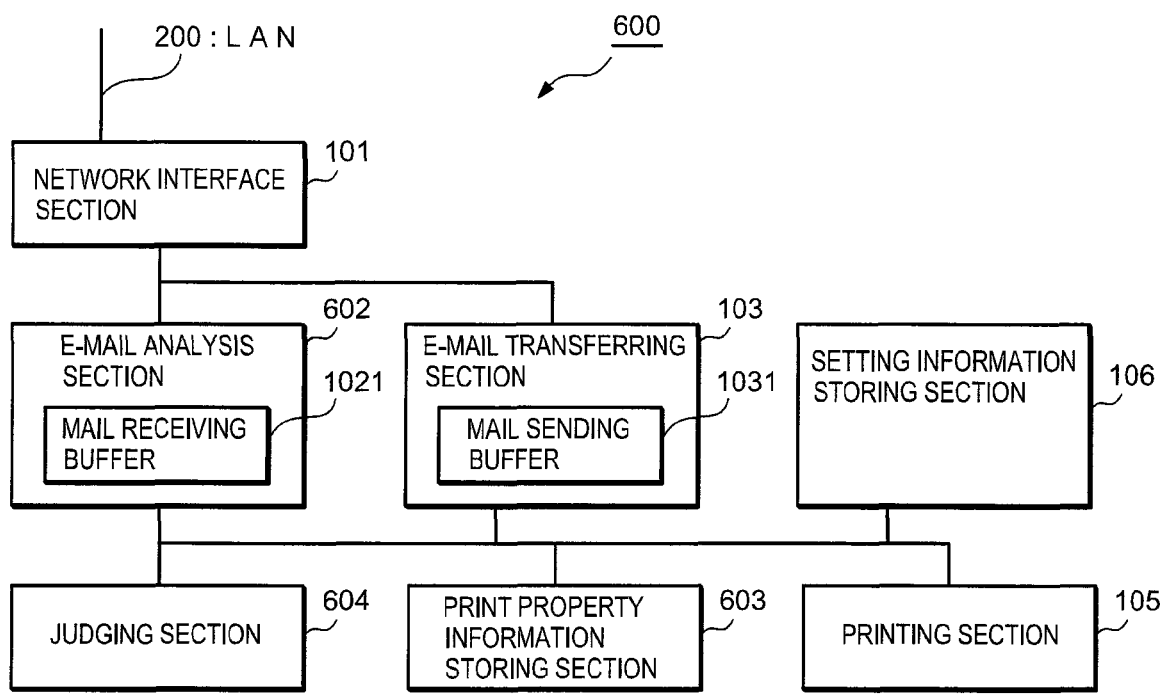
FIG. 11 is functional block diagram of printing apparatus in embodiment 3.

FIG. 11 is functional block diagram of printing apparatus in embodiment 3.

As shown by FIG. 11, printing apparatus 600 in embodiment 3 comprises network interface 101, mail analysis section 602, E-mail transferring section 103, judging section 604, printing section 105, setting information storing section 106 and print property storing section 603. Following will only explain the different part from embodiment 1, and same part and symbol will be omitted.

There's a mail receiving buffer in mail analysis sector 602, which is to analyze the mail received from network interface section 101 and to take out the sending source information, attached file and print property information of the attached file. The sending source information will be temporarily stored in mail receiving buffer, and then be stored in setting information storing section 106. In addition, the print property information will be stored in the following print property storing section 603. Here, mail receiving buffer 1021 is buffer storage to analyze and temporarily store the receiving mail from network interface section 101.

Print property storing section 603 is a section to store the print property information of the attached file extracted from mail analysis section 602. Printing section 105 will print referring to print property storing section 603.

Judging section 604 is a section to analyze and judge whether the attached file extracted from mail analysis sector 602 can be printed through printing section 105. The judgment will cover whether the file is printable based on the print property of the attached file.

The following flowchart is to explain the operation of the printing apparatus 600 in embodiment 3.

Figure 12:
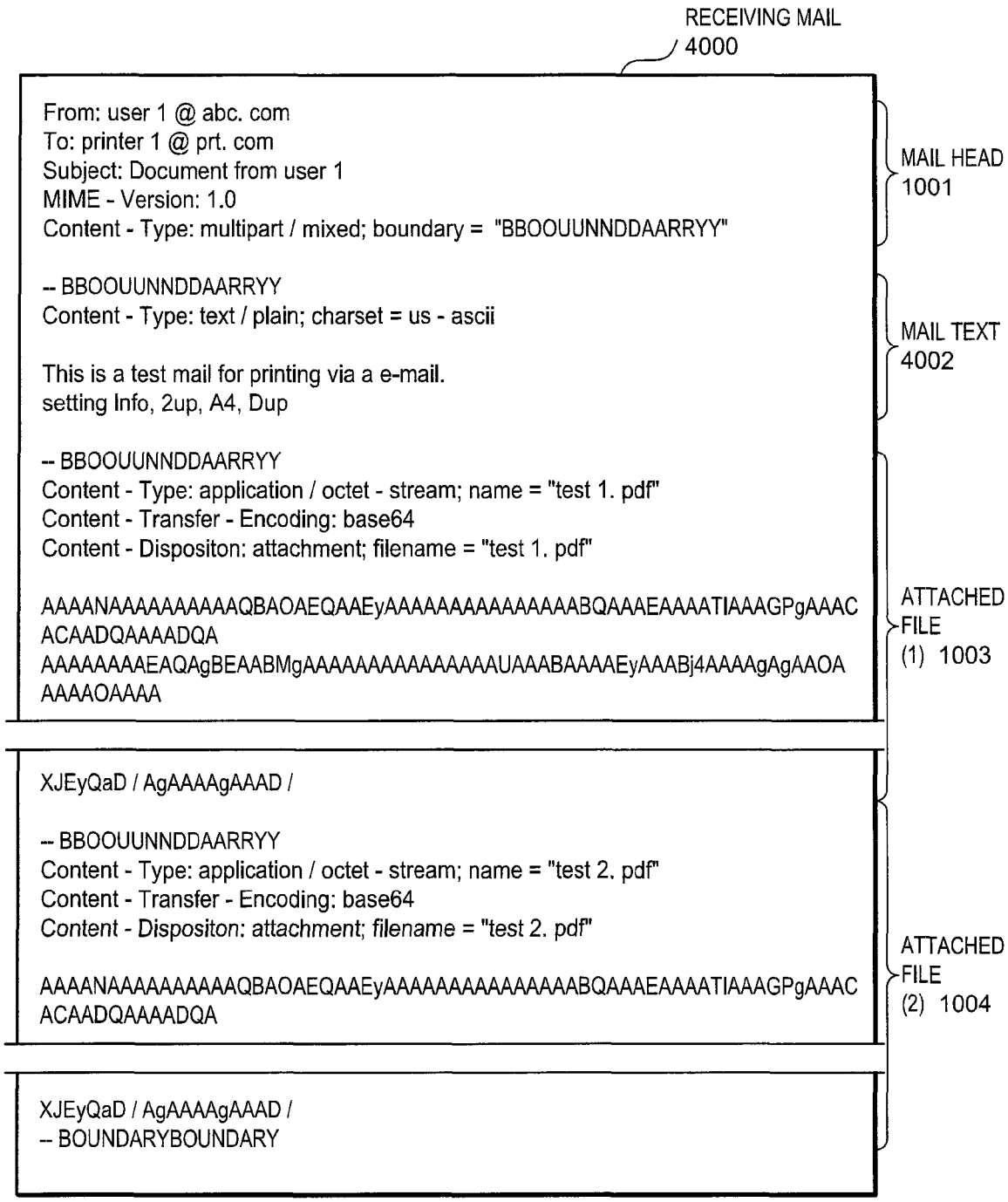
FIG. 12 is an explanation diagram of an example showing content of a receiving mail in embodiment 3.

Firstly, the premise of the operation has the following standards:

As shown by FIG. 19, the E-mail sent by sender PC401 through mail server 402, internet 300 and mail server 202 to printing apparatus 600 will be received by printing apparatus 600. The content of receiving mail 4000 is shown by FIG. 12. As usual, the files are attached under the type of MIME, which is a normal type, so the detail explanation is omitted.

FIG. 12 is an explanation diagram of an example showing content of a receiving mail in embodiment 3.

As shown by FIG. 12, the mail header 1001 is a subject showing the address of the E-mail receiver and the head of the sender, including "MIME-Version" field.

The sending source information is recorded in the field of "From", which is shown as user1@abc.com in receiving mail 4000. The mail text 4002 records the mail body text, in which the print property information: 2up (to print the content of 2 pages on 1 page), A4 (printing paper's size), both-sides (to print on the both sides of the paper) is attached as setting command based on printing language "Setting Info, 2up, A4, Dup".

Attached file (1)1003 is the first attachment, which is attached after BASE64 coding of the file named as "test1.pdf".

Attached file (2)1004 is the second attachment "test2.pdf", which is also attached after BASE64 coding, same as Attached file (1)1003.

In the present embodiment, to explain the operation of printing apparatus 600, assuming that "test1.pdf" attached as attached file (1)1003 is a printable file and "test2.pdf" attached as attached file (2)1004 is an unprintable file due to its version difference. In addition, assuming that "print property information: 2up, A4, both-sides" is executable.

Therefore, according to the above premise, since "test2.pdf" attached as attached file (2)1004 is an unprintable file due to its version difference, the mail transferring section 103 will form a transfer mail and reply to sender PC401. Following is an example of transfer mail, and the detail content will be explained in the operation explanation according to the requests.

Figure 13:
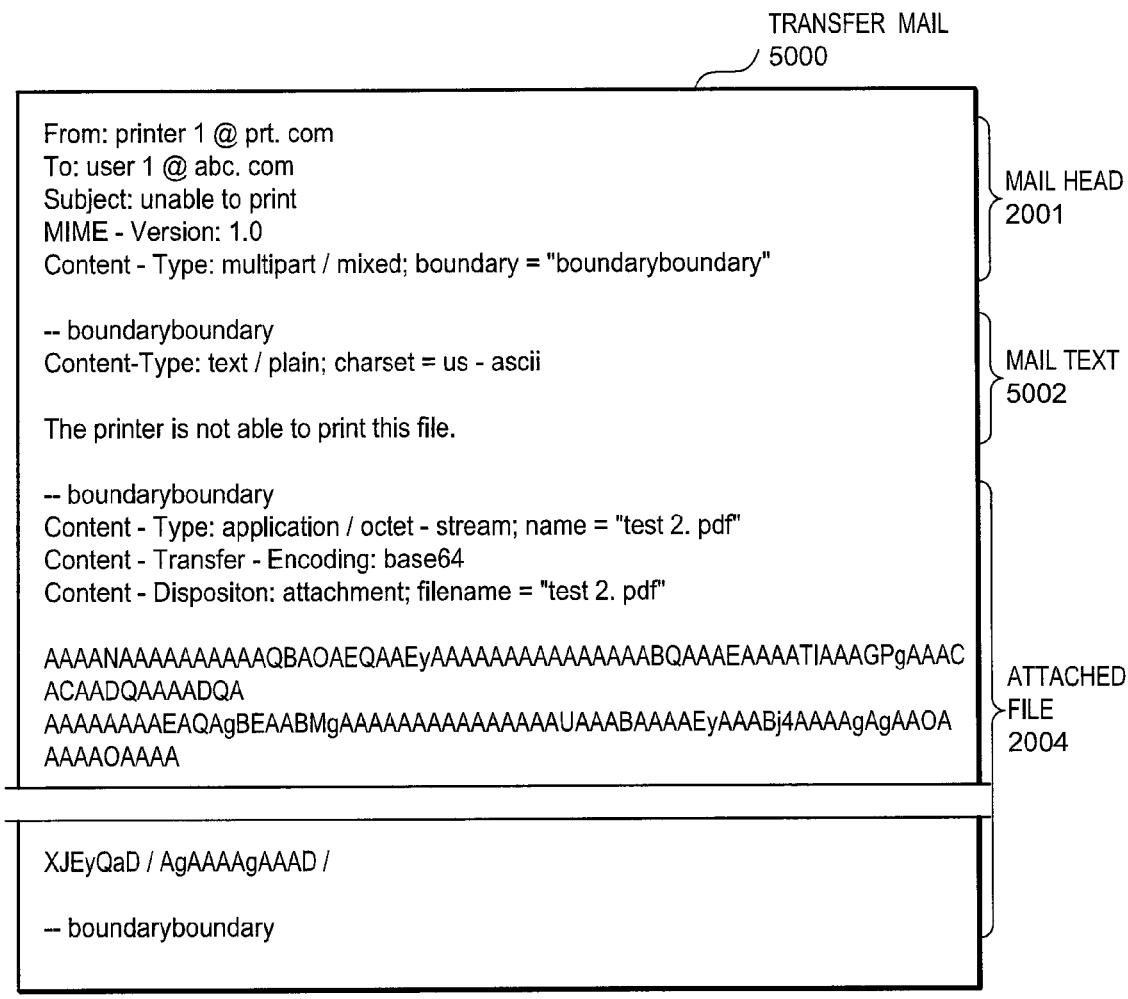
FIG. 13 is an explanation diagram of an example showing content of a transfer mail in embodiment 3.

FIG. 13 is an explanation diagram of an example showing content of a transfer mail in embodiment 3.

As shown by FIG. 13, mail head 2001 is made based on the setting information from setting information storing section 106 and sending source information from receiving mail 4000. And the value in filed "To" of the receiver's address of transfer mail is recorded as user1@abc.com in sending source information from receiving mail 4000. In the present embodiment, Mail text 5002 is recorded as message extracted from setting information storing section 106. "Test2.pdf" is attached as attached file 2004 in the present embodiment according to the above premise.

Printing apparatus 600 will have the following operations according to the above premise.

Figure 14:
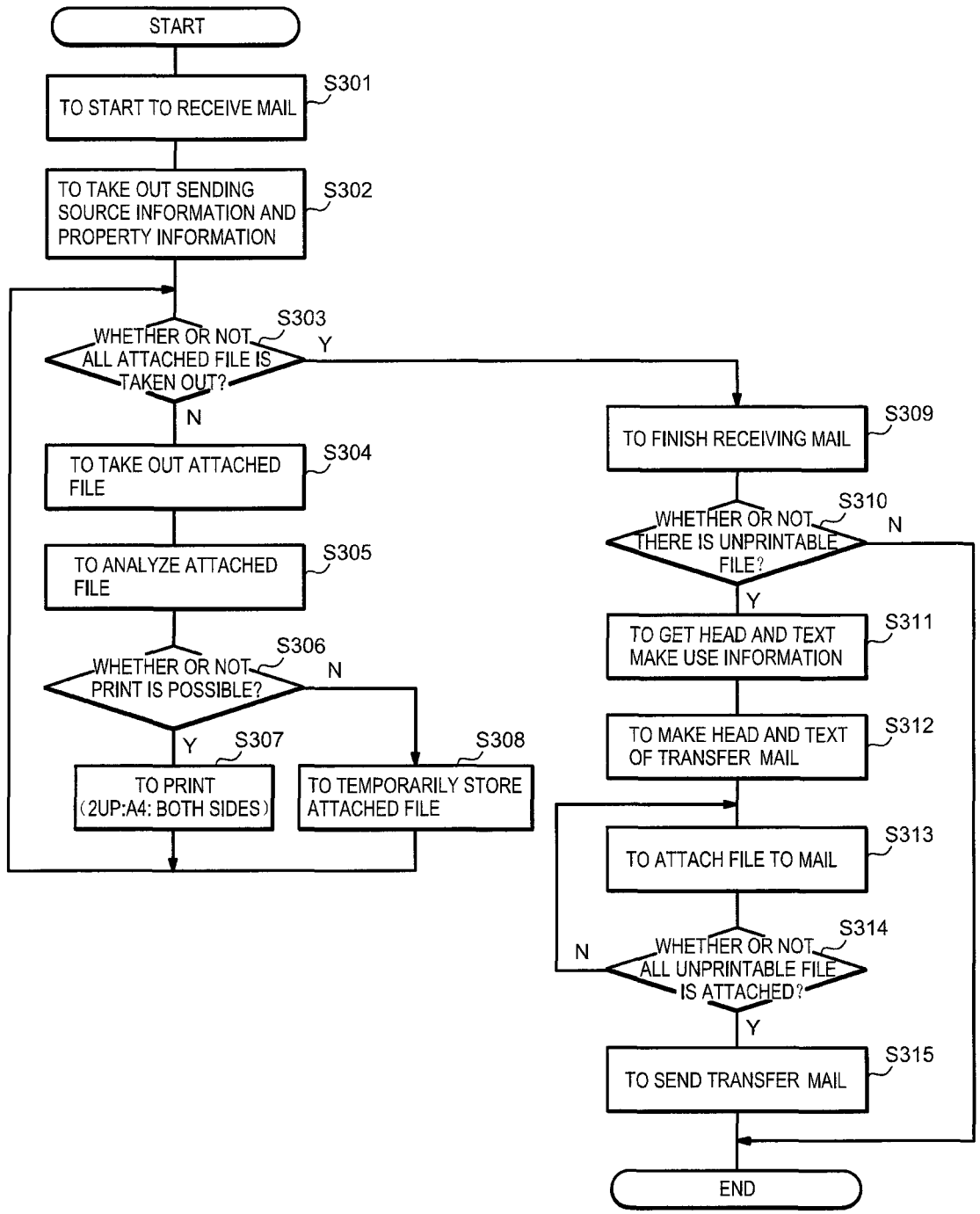
FIG. 14 is a flowchart for explaining operation of printing apparatus in embodiment 3.

FIG. 14 is a flowchart for explaining operation of printing apparatus in embodiment 3.

In the following operation explanation, the action of mail making and sending in the sender PC401 and transferring between mail server 402 and 202 will be omitted since they are common actions. In addition, the explanation of the communication between mail server 202 and network interface 101 of printing apparatus 600 which is based on the SMTP protocol will also be omitted since the control of mail sending and receiving based on SMTP protocol is also a common technique.

Following is the explanation of the steps from S301 to S315 through the FIG. 12 and FIG. 13.

Step S301

Printing apparatus 600 starts to receive mails. The E-mail sent by sender PC401 to printing apparatus 600 will be received through mail server 402, internet 300 and mail server 202.

Step S302

The above receiving mail 4000 will be temporarily stored in the mail receiving buffer 1021 of mail analysis section 602 through network interface 101 and be analyzed. Firstly, mail analysis section 602 will take out the sending source information and print property information from receiving mail 4000, which is temporarily stored in mail analysis section 602, and then be stored to setting information storing section 106. After temporarily stored in mail receiving buffer 1021, the extracted print property information will be stored print property storing section 603. Afterwards, mail analysis section 602 will go on to the action of extract the attached file from receiving mail 4000.

Step S302

Here, if there's no attachment or all the attachments have been taken out, it will go on to Step S309; if there's an attachment that hasn't been analyzed, it will go on to Step S304.

Step S304
Mail analysis section 602 will analyze the receiving mail 4000 from the very beginning. According to the above premise, mail analysis section 602 will firstly take out attached file (1)1003 to do the BASE64 coding, and send the reverted "test1.pdf" to judging section 604.

Step S305
Judging section 604 will receive the attachment from mail analysis section 602 and judge whether it is printable. According to the above premise, "test1.pdf" is judged as printable.

Step S306
If the result of judging the printable, it will go on to the step S307, if not, it will go on to the step S308. Here, for example, if printing section 105 can print PDF file, judging section 604 will judge the limits whether the file has extension name as ".PDF", whether the type of PDF is appropriate and whether it is based on safe printing and so on. According to the above premise, "test1.pdf" is judged as printable, so it will be transferred to printing section 105.

Step S307
Printing apparatus 105 will print out the receiving file according to the print property information stored in print property storing section 603. According to the above premise, "test1.pdf" will be printed on the printing paper according to the print property information: 2up, A4, both-sides. After the process of the first attachment, it will go back to step S303 and add next file to receiving mail 4000 to do the same process till all the files have been finished. According to the above premise, since there is attached file (2)1004, mail analysis section 602 will continue to extract attached file (2)1004 to do BASE64 coding and transferred the reverted "test2.pdf" to judging section 604 (Step S304). Judging section 604 will judge whether the reverted "test2.pdf" can be printed or not (Step S305). Here, according to the above premise, since "test2.pdf" is such a type of file that can't be printed in printing apparatus 105, judging section 604 will judge it as unprintable and go on to Step S308.

Step S308
The unprintable file will be temporarily stored in mail transferring section 103. Here, "test2.pdf" will be transferred to mail transferring section 103 and be temporarily stored in mail sending buffer 1031, and then go back to Step S303. The following will do the same process till all the files have been finished and go on to Step S309. According to the above premise, "test2.pdf" will go on to Step S309 after finished the process.

Step S309
Network interface 101 finishes the action of mail receiving and the receiving mail 4000 in mail receiving buffer 1021 will be abandoned.

Step S310
Afterwards, it will judge whether there's unprintable file in receiving mail 4000. Here, if there's no unprintable file, sending source information in mail sending buffer 1031 will be abandoned, and that's the end of actions of the present embodiment. If there's unprintable file, it will go on to Step S311. According to the above premise, "test2.pdf" will be judged as unprintable file and go on to Step S311.

Step S311
The unprintable file will be temporarily stored in mail sending buffer 1031, and mail transferring section 103 will make transfer mail 5000. Firstly, mail transferring section 103 will extracted information from setting information storing section 106 to make mail head 2001 and mail text 5002.

Step S312
Mail transferring section 103 will continue to make mail head 2001 and mail text 5002 in mail sending buffer 1031. Meanwhile, the sending source information of receiving mail 4000 extracted from Step S302 will be recorded in the mail head 2001 field "To" as receiver's address in transfer mail 5000. According to the above premise, it will be recorded as user1@abc.com Step S313
Afterwards, mail transferring section 103 will add the temporarily stored unprintable file to transfer mail. According to the above premise, "test2.pdf" will be attached to transfer mail.

Step S314
Repeat the action of adding unprintable file to transfer mail till all files have finished this action. According to the above premise, since only "test2.pdf" has been judged as unprintable file in receiving mail 4000, it will go on to next step after transfer mail 5000 finished its making. According to the above premise, transfer mail 5000 through mail transferring section 103 is shown by FIG. 13. Here, mail head 2001 is made based on the setting information from setting information storing section 106 and sending source information from receiving mail 4000. According to the above premise, the value in filed "To" of the receiver's address of transfer mail is recorded as user1@abc.com which is sending source information from receiving mail 4000 in Step S302. Mail text 5002 is recorded as message extracted from setting information storing section 106. "Test2.pdf" is attached as attached file 2004 in the present embodiment.

Step S315
Mail transferring section 103 will transfer the transfer mail to network interface 101, then network interface 101 will send mail to mail server 202, that's the end of the process.

As stated in the above, it has been explained the status when the attached file's print property is completely the same, but the present invention is not limited to this. That is to say, we can set different print property information to the attached file. In this condition, judging section 604 will judge whether the attached file is printable, and printing section 105 will do the action of printing after got the print property from print property storing section 603.

In addition, print property information can not only be attached in the mail text, but also send as attachment. Moreover, two types of print property information can be attached. For example, opposite to the above stated "<test1.pdf>Setting Info, 2up, A4, Dup", "<test2.pdf> Setting Info, 4up (to print the content of 4 pages on 1 page), A4 (printing paper's size), Mono (to print with monochrome)" can also be attached.

Transfer mail 5000 send from mail server 202 will be send to mail server 402 through internet 300. Sender PC 401 will receive transfer mail 5000 through mail server 402. After read transfer mail 5000, sender will know that "test2.pdf" is the only unprintable file in printing apparatus 600; therefore, he will take the solution, such as printing "test2.pdf" with printer driver.

Since "test1.pdf" has already been printed with printing apparatus 600, it will not be attached in transfer mail 5000, and sender has no need to confirm which attachments are printable or not. In addition, if there's such print request that printing apparatus 600 can not support, it will also be informed through transfer mail.

As stated above, through the present embodiment, when two kinds of printable and unprintable attachments are attached in the E-mail, the printable file will be printed with printing apparatus, only the unprintable file will be transferred to a predetermined address. The condition of unprintable can include the print property information. So we get the effect that the sender has no need to confirm which attachments have printed or not. Therefore, sender only has to take the solution such as printing the file in the transfer mail with an application as printing driver.

In the above explanation, we have introduced the embodiment of adding unprintable file to transfer mail, but the present invention is not limited in this example. That is to say, we can use file name to replace the data of unprintable file to inform sender. Moreover, we can use the file name of printable file to replace the data or file name of unprintable file to inform the sender.

<Embodiment 4>

In the present embodiment, the printing apparatus has the confidential function. When there is confidential request in the receiving mail, it will print the attached file confidentially. In order to achieve the objective, the printing apparatus of the present embodiment has the following structure.

Figure 15:
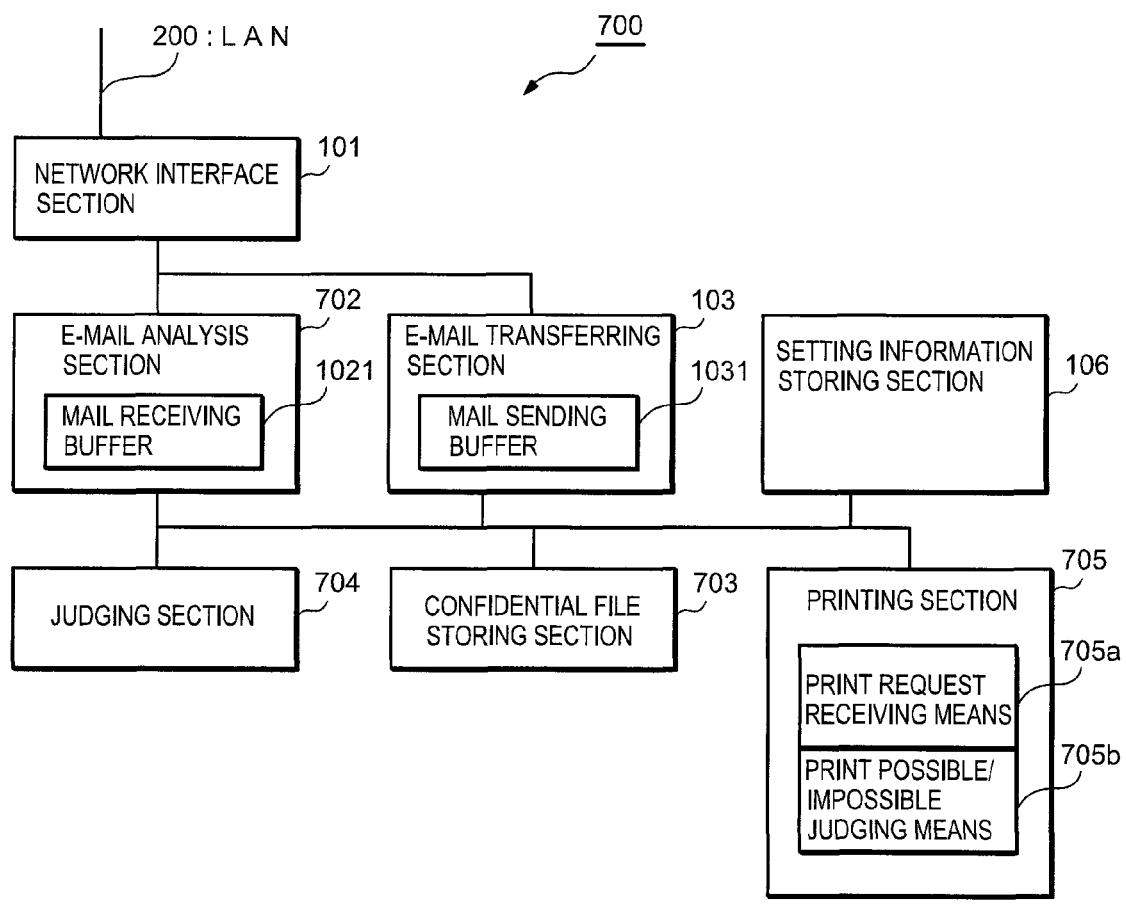
FIG. 15 is a functional block diagram of printing apparatus in embodiment 4.

FIG. 15 is a functional block diagram of printing apparatus in embodiment 4.

As shown by FIG. 15, printing apparatus 700 in embodiment 4 comprises network interface 101, E-mail analysis section 702, E-mail transferring section 103, judging section 704, printing section 705, setting information storing section 106 and confidential file storing section 703. Following will only explain the different part from embodiment 1, and same part and symbol will be omitted.

There is mail receiving section 1021 in mail analysis section 702, which is a section to analyze the mail from network interface section 101 and extract the sending source information, attached file and specific part to be confidentially printed. The information of the mail sender will be stored in setting information storing section 106. In addition, when there's confidential print designation information attached in the mail, E-mail analysis section 702 will store the confidential print designation information to confidential file storing section 703. In the present embodiment, when using "BCC" instead of "To" as sender, it will be regarded as confidential print. Here, mail receiving buffer is buffer storage to analyze the receiving mail from network interface section and temporarily store.

Confidential file storing section 703 is a section that can store the confidential print information and attached file from E-mail analysis section 702. Printing apparatus 705 will refer to the content of confidential file storing section 703 when doing the printing action.

Judging section 704 is a section to analyze the attached file extracted from E-mail analysis section 702 and judge whether it can be printed through printing section 705. In addition, it is also a section to judge whether the printable attached file is assigned as confidential print file, if so, it will store the file to confidential file storing section 703.

Printing section 705 is to print out the printable file judged by judging section 704 to the printing paper. In addition, there are a print request receiving means 705a and a print possible/impossible judging means 705b. Here, print request receiving means 705a is a means to receive a print request of confidentially printing the specific file from the printing user. Print possible/impossible judging means 705b is a section to judge whether the printing user is allowed to print. Following is the explanation of judging whether or not print is possible.

Figure 16:
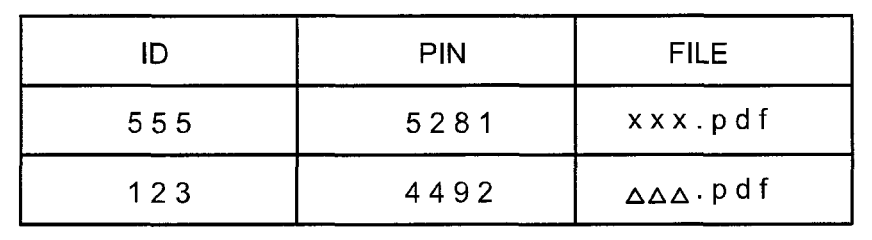

FIG. 16 is an explanation diagram of print possible/impossible judging means.

Print possible/impossible judging means 705b receives the print request send by the user from print request receiving means 705a (operation panel). If the print request is same as the print possible/impossible judgment information that is shown by figure and is previously stored, it will be judged as possible to be printed, if not, it will be judged as impossible to be printed.

That is to say, the user who sent out the print request will go to the printing apparatus 700 and key in the user ID, PIN NO on print request receiving means 705a (operation panel), as shown by the figure, print possible/impossible judging means 705b will do the judgment, if it is judged as the same as the whether or not print is possible judging information (an example), the printing section 705 will print out the relevant attached file.

The following flowchart is to explain the operation of the printing apparatus 700 in embodiment 4.

Figure 17:
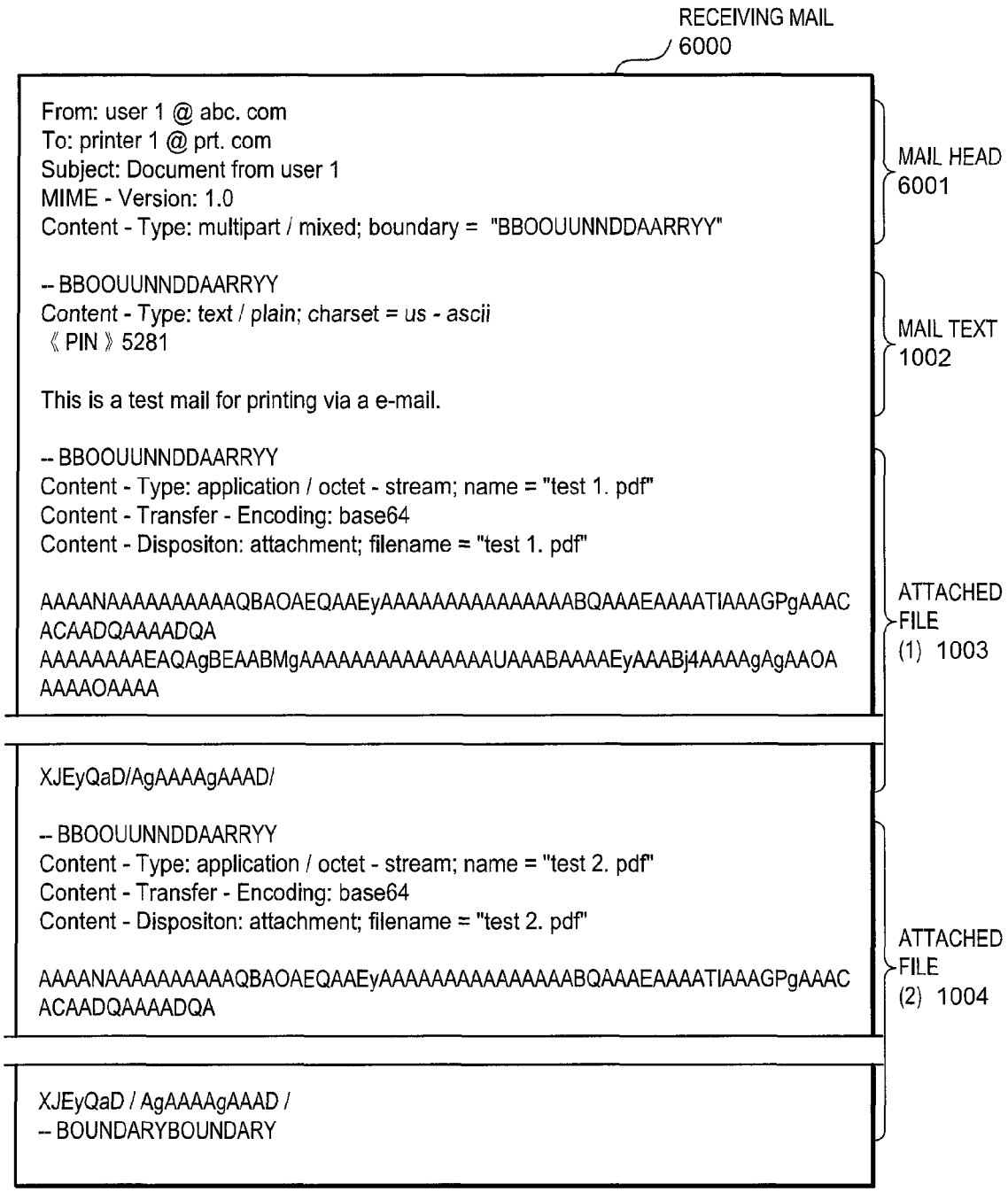
FIG. 17 is an explanation diagram of an example showing content of a receiving mail in embodiment 4.

Firstly, the premise of the operation has the following standards:

As shown by FIG. 19, the sender will use send PC 401 to send E-mail through mail server 402, internet 300 and mail server 202 to the printing apparatus 700, and received by the printing apparatus 700. The content of receiving mail 6000 is shown by FIG. 17 (the example). As usual, the files are attached under the type of MIME, which is a normal type, so the detail explanation is omitted.

FIG. 17 is an explanation diagram of an example showing content of a receiving mail in embodiment 4.

As shown by FIG. 17, the mail header 6001 is a subject showing the address of the E-mail receiver and sender, including "MIME-Version" field.

In addition, assuming that the sending source information is recorded in the field of "From", which is shown as user1{fourth root}abc.com in receiving mail 6000, including the confidential print request of the attached file BCC: printer1@prt.com . The mail text 1002 records the mail body text.

Attached file (1)1003 is the first attachment, which is attached after BASE64 coding of the file named as "test1.pdf".

Attached file (2)1004 is the second attachment "test2.pdf", which is also attached after BASE64 coding, same as Attached file (1)1003.

In the present embodiment, to explain the operation of printing apparatus 700, assuming that "test1.pdf" attached as attached file (1)1003 is a printable file and "test2.pdf" attached as attached file (2)1004 is an unprintable file due to its version difference, according to the above premise, the mail transferring section 103 will form a transfer mail and reply to sender PC401 since the attached file (2)1004 is unprintable due to its version. The explanation of the said transfer mail will be omitted since it is same as transfer mail 2000 (FIG. 4) in embodiment 1.

Printing apparatus 700 will have the following operations according to the above premise.

Figure 18:
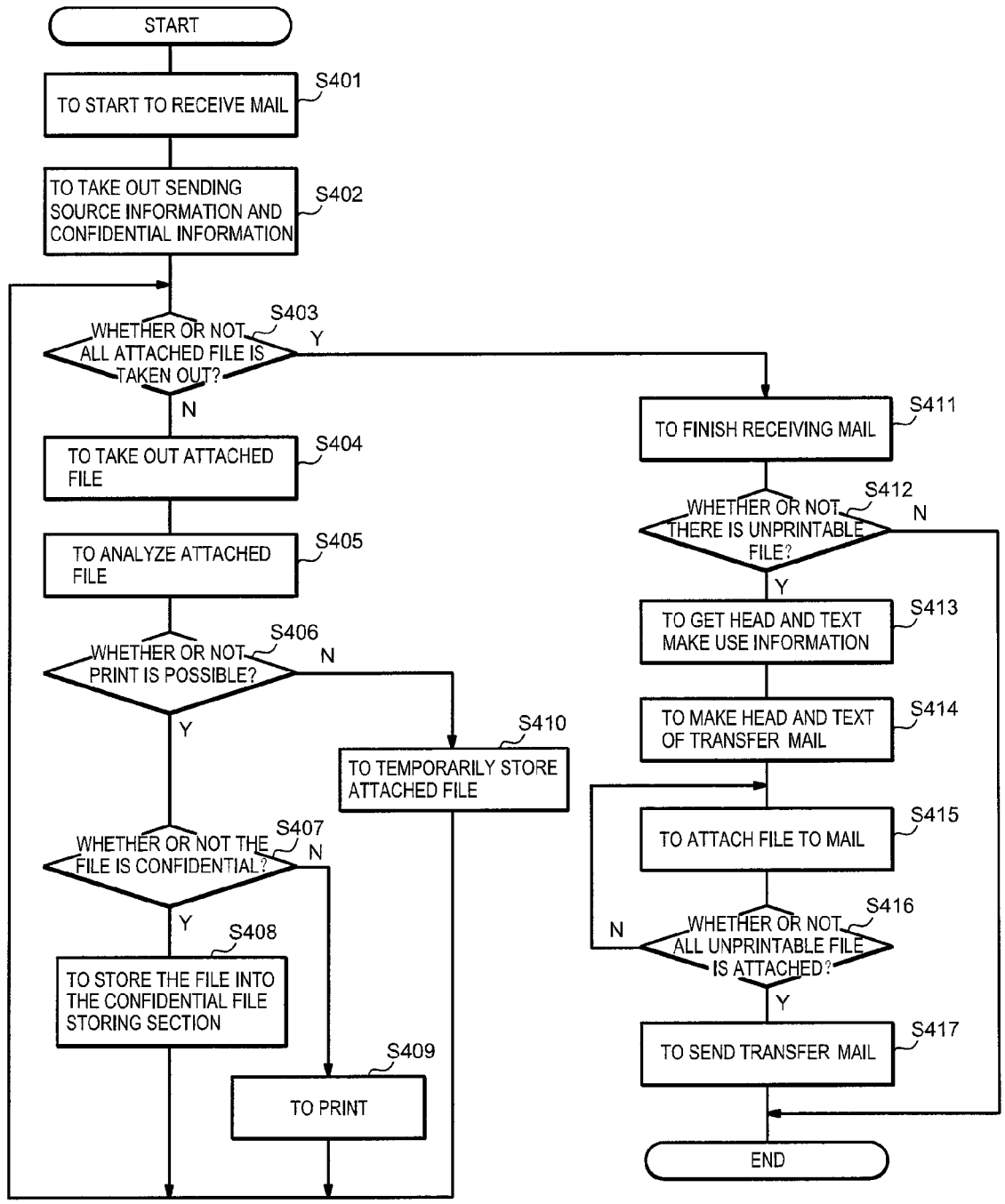
FIG. 18 is a flowchart for explaining operation of printing apparatus in embodiment 4.

FIG. 18 is a flowchart for explaining operation of printing apparatus in embodiment 4.

In the following operation explanation, the action of mail making and sending in the sender PC401 and transferring between mail server 402 and 202 will be omitted since they are common actions. In addition, the explanation of the communication between mail server 202 and network interface 101 of printing apparatus 700 which is based on the SMTP protocol will also be omitted since the control of mail sending and receiving based on SMTP protocol is also a common technique.

Following is the explanation of the steps from S401 to S417 through FIG. 4, FIG. 15, FIG. 16 and FIG. 17.

Step S401

Printing apparatus 700 starts to receive mails. The stated receiving mail 6000 sent by sender PC401 will be received through mail server 402, internet 300 and mail server 202.

Step S402

The stated receiving mail 6000 will be temporarily stored in the mail receiving buffer 1021 of mail analysis section 702 through network interface 101 and be analyzed. Firstly, mail analysis section 702 will take out the sending source information and confidential print information from receiving mail 6000, which is temporarily stored in the mail receiving buffer 1021 of mail analysis section 702, and then be stored to setting information storing section 106. After temporarily stored in mail receiving buffer 1021, the extracted confidential print information will be stored in confidential print storing section 703. Afterwards, mail analysis section 702 will go on to the action of extract the attached file from receiving mail 6000.

Step S402

Here, if there's no attachment or all the attachments have been taken out, it will go on to Step S411; if there's an attachment that hasn't been analyzed, it will go on to Step S404.

Step S404

Mail analysis section 702 will analyze the receiving mail 6000 from the very beginning. According to the above premise, mail analysis section 702 will firstly take out attached file (1)1003 to do the BASE64 coding, and send the reverted "test1.pdf" to judging section 704.

Step S405

Judging section 704 will receive the attachment from mail analysis section 702 and judge whether it is printable. According to the above premise, "test1.pdf" is judged as printable.

Step S406

If the result of judging the printable, it will go on to the step S407, if not, it will go on to the step S410. Here, for example, if printing section 105 can print PDF file, judging section 704 will judge the limits whether the file has extension name as ".PDF", whether the type of PDF is appropriate and whether it is based on safe printing and so on. According to the above premise, "test1.pdf" is judged as printable, so it will go on to Step S407.

Step S407

If it is assigned to be confidentially printed, it will go on to Step S408, if not, it will go on to Step S409. Here, according to the above premise, it is assigned to be confidentially printed; it will go on to Step S408.

Step S408

The attached file will be stored in the confidential file storing section 703. After the process of the first attachment, it will go back to step S403 and add next file to receiving mail 6000 to do the same process till all the files have been finished.

Step S409

The attached file will be sent to printing section 705, and printing section 705 will print out the received file, and back to Step S403 and add next file to receiving mail 6000 to do the same process till all the files have been finished.

According to the above premise, since there is attached file (2)1004, mail analysis section 702 will continue to extract attached file (2)1004 to do BASE64 coding and transferred the reverted "test2.pdf" to judging section 704 (Step S404). Judging section 704 will judge whether the reverted "test2.pdf" can be printed or not (Step S705). Here, according to the above premise, since "test2.pdf" is such a type of file that can't be printed in printing apparatus 705, judging section 704 will judge it as unprintable and go on to Step S410.

Step S410

The unprintable file will be sent to the mail transferring section 103. According to the above premise, here, "test2.pdf" will be transferred to mail transferring section 103 and be temporarily stored in mail sending buffer 1031, and then go back to Step S403. The following will do the same process till all the files have been finished and go on to Step S411. According to the above premise, "test2.pdf" will go on to Step S411 after finished the process.

Step S411

Network interface 101 finishes the action of mail receiving and the receiving mail 6000 in mail receiving buffer 1021 will be abandoned.

Step S412

Afterwards, it will judge whether there's unprintable file in receiving mail 6000. Here, if there's no unprintable file, sending source information in mail sending buffer 1031 will be abandoned, and that's the end of actions of the present embodiment. If there's unprintable file, it will go on to Step S413. According to the above premise, "test2.pdf" will be judged as unprintable file and go on to Step S413.

Step S413

The unprintable file will be temporarily stored in mail sending buffer 1031, and mail transferring section 103 will make transfer mail 2000. Firstly, mail transferring section 103 will extracted information from setting information storing section 106 to make mail head 2001 and mail text 2002.

Step S414

Mail transferring section 103 will continue to make mail head 2001 and mail text 2002 in mail sending buffer 1031. Meanwhile, the sending source information of receiving mail 6000 extracted from Step S402 will be recorded in the mail head 2001 field "To" as receiver's address in transfer mail 2000. According to the above premise, it will be recorded as user1@abc.com Step S415

Afterwards, mail transferring section 103 will add the temporarily stored unprintable file to transfer mail. According to the above premise, "test2.pdf" will be attached to transfer mail.

Step S416

Repeat the action of adding unprintable file to transfer mail till all files have finished this action. According to the above premise, since only "test2.pdf" has been judged as unprintable file in receiving mail 6000, it will go on to next step after transfer mail 2000 finished its making. According to the above premise, transfer mail 2000 through mail transferring section 103 is shown by FIG. 4. Here, mail head 2001 is made based on the setting information from setting information storing section 106 and sending source information from receiving mail 6000. According to the above premise, the value in filed "To" of the receiver's address of transfer mail is recorded as user1@abc.com which is sending source information from receiving mail 6000 in Step S402. Mail text 2002 is recorded as message extracted from setting information storing section 106. "Test2.pdf" is attached as attached file 2004 in the present embodiment.

Step S417

Mail transferring section 103 will transfer the transfer mail to network interface 101, then network interface 101 will send mail to mail server 202, that's the end of the process.

In addition, about the attached file which is stored to the confidential print storing section 703, since printing section 705 has a print request receiving means 705a and a print possible/impossible judging means 705b, it will do the confidential print for the attached file which is assigned to be confidentially printed. But the explanation of the function of confidential print will be omitted, since it's a common function.

As stated in the above, it has been explained the status when all attached file are assigned to be confidentially printed, but the present invention is not limited to this. That is to say, we can set separate designation of to be confidentially printed to several attached file. In this condition, judging section 704 will judge whether the attached file is assigned to be confidentially printed, and store the attached file which is assigned to be confidentially printed to confidential file storing section 703.

As stated above, transfer mail 2000 which is sent to mail server 202 will be transferred to mail sever 402 through internet 300.

Sender will receive transfer mail 2000 from mail server 402 through sender PC401. After read transfer mail 2000, sender will know that "test2.pdf" is the only unprintable file in printing apparatus 700; therefore, he will take the solution, such as printing "test2.pdf" with printer driver.

Since "test1.pdf" is stored in confidential file storing section 703 in printing apparatus 700, it will not be attached to transfer mail 2000, sender has no need to confirm which attachments are printable or not (or be stored to the confidential file storing section 703) and which attachment are not stored to the confidential file storing section 703 and also unprintable.

As stated above, through the present embodiment, we can not only get the effect of embodiment 1, but also to assign the confidential print to the sending mail to get the effect of enhancing the confidentiality.

In the above explanation, we have introduced the embodiment of adding unprintable file to transfer mail, but the present invention is not limited to this example. That is to say, we can use file name to replace the data of unprintable file to inform sender. Moreover, we can use the file name of printable file to replace the data or file name of unprintable file to inform the sender.

The utilization possibility on industry:

As stated above, the case to apply the present invention to a printer is explained, but the present invention is not limited to the case, it also can be applied to the multifunctional apparatus. In addition, it is explained when using SMTP as mail receiving protocol, and it can get the same effect when using POP3, IMAP4 as mail receiving protocol.

As stated above, the case to apply the printable version "PDF" is explained, but the present invention is not limited to the case, it can also get the same effect when printing "JPEG", and "TIEF" file or file using word processor.

As stated above, it is explained the status that the mail body text is not the printing object, and it can also get the effect when both mail body text and attached file are set as printable form.

In addition, in the above embodiment 2, the receiver address in transfer mail which has been attached the unprintable file, is set as the administrator of the printing apparatus, and it will get the same effect when transferring to the send address in the receiving mail. When transferring, set "To" as reply address, administrator and sender can be attached to "CC" to transfer the error message.

The present invention is not limited to the foregoing embodiments but many modifications and variations are possible within the spirit and scope of the appended claims of the invention.

What is claimed is:

1. A printing apparatus which can print a file attached in a received mail, comprising:
    a judging section which (i) judges whether or not the attached file in the received mail is printable, and if the attached file is printable, (ii) judges whether a mail address of the printing apparatus is included in a Blind Carbon Copy ("BCC") field of the received mail;
    a confidential file storing section configured to store the attached file in the received mail if the mail address of the printing apparatus is included in the Blind Carbon Copy field;
    an operation panel that receives an input of a print request of the attached file stored in the confidential file storing section;
    a transferring section that, i) if the attached file is unprintable on the basis of a judgment result of the judging section, generates a first transfer mail which contains a file name of the unprintable file and transfers the first transfer mail to a first predetermined transfer destination, and ii) if the attached file is printable on the basis of a judgment result of the judging section, generates a second transfer mail which contains a file name of the printable file and transfers the second transfer mail to a second predetermined transfer destination; and
    a printing section that (i) receives a print request from the operation panel to print the attached file, and (ii) prints the attached file from the confidential file storing section in the case where (a) the judging section determines that the attached file is printable and (b) the requesting user is permitted to print the attached file.

2. The printing apparatus according to claim 1,
    wherein plural files are attached in the received mail,
    the judging section judges whether or not it is possible to be printed with respect to each attached file,
    the transferring section selects an unprintable file from the plural files according to the judgment result of the judging section, generates the first transfer mail which contains information to specify the unprintable file and transfers the first transfer mail to the first predetermined transfer destination.

3. The printing apparatus according to claim 1,
    wherein information used for specifying that the attached file is unprintable is such information representing to attach the unprintable file to the first transfer mail.

4. The printing apparatus according to claim 1,
    wherein the received mail includes print property information of the attached file, and the judging whether or not the file is printable includes a judgment of the print property information of the attached file.

5. The printing apparatus according to claim 1,
    wherein the first and the second predetermined transfer destination is a sending source of the received mail.

6. The printing apparatus according to claim 1,
    wherein the first and the second predetermined transfer destination is an administrator of the printing apparatus.

7. A printing apparatus which can print a file attached in a received mail, the received mail having identification information added to the received mail, comprising:
    a judging section that judges whether or not a mail address of the printing apparatus is included in a Blind Carbon Copy field of the received mail;
    a confidential file storing section that stores the attached file when the mail address of the printing apparatus is included in the Blind Carbon Copy field;

an operation panel that receives a print request input of the attached file stored in the confidential file storing section; and a printing section that (i) receives the print request to print the attached file from the operation panel, (ii) judges that the user is permitted to print the attached file, and (iii) prints the attached file from the confidential file storing section if an input information matches with the identification information.

8. The printing apparatus according to claim 7, further comprising:

a judgment information storing section that stores judgment information used for judging the user who is allowed to perform confidential print;

an inputting section that inputs judgment information through the user; and a print possible/impossible judging section that judges that print is possible when the inputted judgment information agrees with the judgment information stored in the judgment information storing section.

9. The printing apparatus according to claim 7, wherein when a plurality of files are attached in the received mail, it is possible to separately designate a confidential print to each attached file.

10. The printing apparatus according to claim 7, wherein the identification information is a Personal Identification Number.

* * * * *